US009159277B2

(12) United States Patent
English et al.

(10) Patent No.: US 9,159,277 B2
(45) Date of Patent: Oct. 13, 2015

(54) CIRCUITS FOR CONTROLLING AN ARRAY OF LIGHT MODULATORS OF A DISPLAY APPARATUS TO GENERATE DISPLAY IMAGES

(71) Applicant: Pixtronix, Inc., San Diego, CA (US)

(72) Inventors: Stephen English, Billerica, MA (US); Stephen R. Lewis, Reading, MA (US)

(73) Assignee: Pixtronix, Inc., San Diego, CA (US)

( * ) Notice: Subject to any disclaimer, the term of this patent is extended or adjusted under 35 U.S.C. 154(b) by 208 days.

(21) Appl. No.: 13/622,980

(22) Filed: Sep. 19, 2012

(65) Prior Publication Data

US 2013/0069929 A1 Mar. 21, 2013

Related U.S. Application Data

(60) Provisional application No. 61/536,692, filed on Sep. 20, 2011.

(51) Int. Cl.
*G06F 3/038* (2013.01)
*G09G 3/34* (2006.01)

(52) U.S. Cl.
CPC .............. *G09G 3/3466* (2013.01); *G09G 3/346* (2013.01); *G09G 2300/0473* (2013.01); *G09G 2300/0842* (2013.01); *G09G 2310/0248* (2013.01)

(58) Field of Classification Search
CPC .... G02B 6/0043; G02B 26/04; G09G 3/3433; G09G 2300/0473; G09G 2300/0842; G09G 2310/0248; G09G 3/346; G09G 3/3466
USPC ........ 359/298; 345/108–110, 84–85; 348/296
See application file for complete search history.

(56) References Cited

U.S. PATENT DOCUMENTS

| | | | | |
|---|---|---|---|---|
| 5,491,347 | A | 2/1996 | Allen et al. | |
| 6,046,840 | A * | 4/2000 | Huibers | 359/291 |
| 6,912,082 | B1 | 6/2005 | Lu et al. | |
| 7,142,346 | B2 | 11/2006 | Chui et al. | |
| 2006/0256039 | A1 * | 11/2006 | Hagood et al. | 345/55 |
| 2007/0086078 | A1 * | 4/2007 | Hagood et al. | 359/298 |
| 2008/0129681 | A1 | 6/2008 | Hagood et al. | |

(Continued)

OTHER PUBLICATIONS

Wikipedia page on multiplexer (both mux and demux idea is discussed), available at https://web.archive.org/web/20100209022248/http://en.wikipedia.org/wiki/Multiplexer, dated on Feb. 9, 2010, and attached as mux.pdf in this office action.*

(Continued)

*Primary Examiner* — Charles V Hicks
*Assistant Examiner* — Charles Zheng
(74) *Attorney, Agent, or Firm* — Edward A. Gordon; Foley & Lardner LLP

(57) ABSTRACT

A display includes an array of light modulators each having a first actuator and a second actuator. A control matrix includes a circuit having a first state inverter having an output coupled to an input of a second state inverter. A data store capacitor is coupled to an input of the first inverter and configured to store a data voltage corresponding to a future pixel state of the pixel. A first update interconnect is coupled to the first state inverter and configured such that altering a voltage applied to the first update interconnect causes the first actuator to respond to the stored data voltage. A second update interconnect is coupled to the second state inverter and configured such that altering a voltage applied to the second update interconnect causes the second actuator to respond to a voltage state of the first inverter.

23 Claims, 17 Drawing Sheets

(56) References Cited

U.S. PATENT DOCUMENTS

| | | | | |
|---|---|---|---|---|
| 2010/0039422 | A1* | 2/2010 | Seto | 345/212 |
| 2011/0148948 | A1 | 6/2011 | Gandhi et al. | |
| 2011/0164067 | A1* | 7/2011 | Lewis et al. | 345/690 |
| 2012/0120036 | A1 | 5/2012 | Yamashita et al. | |

OTHER PUBLICATIONS

International Search Report and Written Opinion—PCT/US2012/056391—ISA/EPO—Jan. 8, 2013.

Taiwan Search Report—TW101134588—TIPO—Aug. 27, 2014.

* cited by examiner

CIRCUITS FOR CONTROLLING AN ARRAY OF LIGHT MODULATORS OF A DISPLAY APPARATUS TO GENERATE DISPLAY IMAGES

RELATED APPLICATION

This Patent Application claims priority to U.S. Provisional Patent Application No. 61/536,692, filed on Sep. 20, 2011, entitled "Circuits for Controlling Display Apparatus." The disclosure of the prior application is considered part of and is incorporated by reference in this Patent Application.

TECHNICAL FIELD

This disclosure relates to the field of electromechanical systems (EMS). In particular, this disclosure relates to circuits for controlling an array of EMS light modulators of a display apparatus to generate display images.

DESCRIPTION OF THE RELATED TECHNOLOGY

Various display apparatus include an array of display pixels that have corresponding light modulators that transmit or reflect light to form images. The light modulators include actuators for driving the light modulators between a first state and a second opposite state. In certain display apparatus, it is desirable to increase the speed and reliability of the light modulators. The light modulators are controlled by a collection of circuits referred to as control matrix.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus that includes an array of display elements that each have a first actuator configured to drive the display element into a first state and a second actuator configured to drive the display element into a second state. The display apparatus also includes a control matrix that includes, for each pixel, a circuit that includes a first state inverter and a second state inverter. The first state inverter has an output coupled to an input of the second state inverter. The control matrix also includes, for each pixel, a data store capacitor coupled to an input of the first inverter. The data store capacitor is configured to store a data voltage corresponding to a future pixel state of the pixel. For each pixel, the control matrix also includes a first update interconnect coupled to the first state inverter. The first update interconnect is configured such that altering a voltage applied to the first update interconnect causes the first actuator to respond to the data voltage stored on the data store capacitor. For each pixel, the control matrix also includes a second update interconnect coupled to the second state inverter. The second update interconnect is configured such that altering a voltage applied to the second update interconnect causes the second actuator to respond to a voltage state of the first inverter. In some implementations, the control matrix is using transistors having a layer of Indium-gallium-zinc-oxide (IGZO). In some implementations, the display apparatus is configured to maintain the actuation voltage interconnect at about an actuation voltage throughout addressing and activation of the plurality of display elements.

In some implementations, the display apparatus is configured to lower a voltage applied to the first update interconnect to a first low voltage to cause the first inverter to respond to data stored on the data store capacitor. After the first inverter responds to the data stored on the data store capacitor, the display apparatus is configured to lower a voltage applied to the second update interconnect to cause the second inverter to respond to the voltage state of the first inverter.

In some implementations, the first inverter includes a first discharge transistor coupled to the first update interconnect and the second inverter includes a second discharge transistor coupled to the second update interconnect. An output of the first discharge transistor is coupled to the input of the second discharge transistor. Upon lowering the voltage applied to the first update interconnect to the first low voltage, the first discharge transistor is responsive to the data stored on the data store capacitor causing the first inverter to assume a state responsive to the data stored on the data store capacitor. Upon lowering the voltage applied to the second update interconnect, the second discharge transistor is responsive to the state of the first inverter such that the second inverter assumes a state opposite the state of the first inverter. In some implementations, the display apparatus is configured to activate at least one light source responsive to the second inverter assuming a state opposite the state of the first inverter.

In some implementations, the display apparatus is configured to raise a voltage applied to the first update interconnect to a first voltage state to cause the first inverter to respond to data stored on the data store capacitor. After the first inverter responds to the data stored on the data store capacitor, the display apparatus is configured to raise a voltage applied to the second update interconnect to cause the second inverter to respond to the voltage state of the first inverter.

In some implementations, the first inverter includes a first discharge transistor coupled to the first update interconnect and the second inverter includes a second discharge transistor coupled to the second update interconnect. An output of the first discharge transistor is coupled to the input of the second discharge transistor. Upon raising the voltage applied to the first update interconnect to the first voltage state, the first discharge transistor is responsive to the data stored on the data store capacitor which causes the first inverter to assume a state responsive to the data stored on the data store capacitor. Upon raising the voltage applied to the second update interconnect, the second discharge transistor is responsive to the state of the first inverter such that the second inverter assumes a state opposite the state of the first inverter. In some implementations, the display apparatus is configured to activate at least one light source responsive to the second inverter assuming a state opposite the state of the first inverter.

In some implementations, the circuit is symmetric such that the input of the first state inverter and the input of the second state inverter are configured to receive complementary data inputs. In some implementations, the circuit includes one of only n-type transistors and only p-type transistors.

In some implementations, the circuit further includes a single actuation voltage interconnect coupled to the first state inverter and the second state inverter. In some implementations, the first state inverter includes a first charge transistor coupled to the actuation voltage interconnect and the second inverter includes a second charge transistor coupled to the actuation voltage interconnect. In some implementations, the circuit further includes a pre-charge voltage interconnect coupled to the first state inverter and the second state inverter. In some implementations, the circuit further includes a precharge voltage interconnect coupled to the first state inverter and the second state inverter.

In some implementations, the display elements include light modulators. In some implementations, the display elements include electromechanical system (EMS) display elements. In some implementations, the display elements include microelectromechanical system (MEMS) display elements.

In some implementations, the display apparatus includes a module incorporating the array of display elements and the controller, a processor configured to process image data and a memory device that is configured to communicate with the processor.

In some implementations, the controller includes at least one of the processor and the memory device. In some implementations, the apparatus includes a driver circuit configured to send at least one signal to the display module and the processor is further configured to send at least a portion of the image data to the driver circuit.

In some implementations, the apparatus includes an image source module configured to send the image data to the processor. In some such implementations, the image source module includes at least one of a receiver, transceiver, and transmitter. In some implementations, the apparatus includes an input device configured to receive input data and to communicate the input data to the processor.

One innovative aspect of the subject matter described in this disclosure can be implemented in a method for generating images on a display apparatus. The method includes applying, to a circuit including a first state inverter and a second state inverter, a first precharge voltage to a first actuation node corresponding to the first state inverter and a second precharge voltage to a second actuation node corresponding to the second state inverter. The method also includes updating the first precharge voltage applied to the first actuation node in response to a data voltage corresponding to a future pixel state of the pixel. The method also includes updating the second precharge voltage applied to the second actuation node in response to updating the first precharge voltage applied to the first actuation node. Further, the method includes activating a light source to generate an image on the display apparatus.

In some implementations, updating the first precharge voltage applied to the first actuation node includes bringing the first update interconnect to a low voltage. In some implementations, updating the second precharge voltage includes bringing the second update interconnect to a low voltage. In some implementations, a display element of the display apparatus is adjusted responsive to the first precharge voltage at the first actuation node and the second precharge voltage at the second actuation node.

Details of one or more implementations of the subject matter described in this specification are set forth in the accompanying drawings and the description below. Although the examples provided in this summary are primarily described in terms of electromechanical systems (EMS) based displays, the concepts provided herein may apply to other types of displays, such as liquid crystal displays (LCD), organic light-emitting diode (OLED) displays, electrophoretic displays, and field emission displays, as well as to other non-display EMS devices, such as EMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

This disclosure relates to circuits for controlling an array of display elements of a display apparatus to generate images on the display. In some implementations, each display element corresponds to a display pixel. Certain display apparatus include display elements, such as light modulators, that include one or more actuators for driving the light modulators into a first state, such as an ON state, in which the light modulator transmits light and a second state, such as an OFF state, in which the light modulator does not output any light. The circuits used to drive the actuators described above are arranged into a control matrix. The control matrix addresses each pixel of the array to either be in an ON state corresponding to an ON state for a corresponding light modulator or an OFF state corresponding to the OFF state of the corresponding light modulator for any given image frame.

In certain display apparatus, the control matrix may include transistors that incorporate a metal-oxide layer, such as Indium-gallium-zinc-oxide (InGaZnO), commonly referred to IGZO. Control matrices, such as those made from IGZO, may be built using a single type of transistor, for example, only n-MOS transistors. Other control matrices using other materials may be built using only p-MOS transistors. Control matrices that are built using only one type of transistor are generally less reliable than those that incorporate both n-MOS and p-MOS transistors. To improve reliability of such control matrices that include only one type of transistor, some control matrices may utilize multiple data or actuation voltage interconnects. This can result in significant additional power consumption and decreases available substrate space for light throughput, decreasing the display brightness.

To achieve the benefits of using metal-oxide based transistors, while mitigating the unreliability of single transistor type control matrices and without compromising for the additional power consumption, a control matrix can, in some implementations, include a single actuation voltage interconnect and two separate update interconnects. By utilizing two separate update interconnects, each configured to independently control discharge transistors of the circuit, the control matrix can reliably control the state of the pixel, preventing the pixel from entering in an indeterminate state.

Particular implementations of the subject matter described in this disclosure can be implemented to realize one or more of the following potential advantages. By utilizing two separate update interconnects, each configured to independently control discharge transistors of a control matrix, the control matrix can be made from substrates, such as IGZO, on which only one type of transistors are formed. In this way, the control matrix is able to benefit from the improved substrate properties, while mitigating unreliability of such control matrices and without having to compromise on the additional power consumption.

Figure 1A:
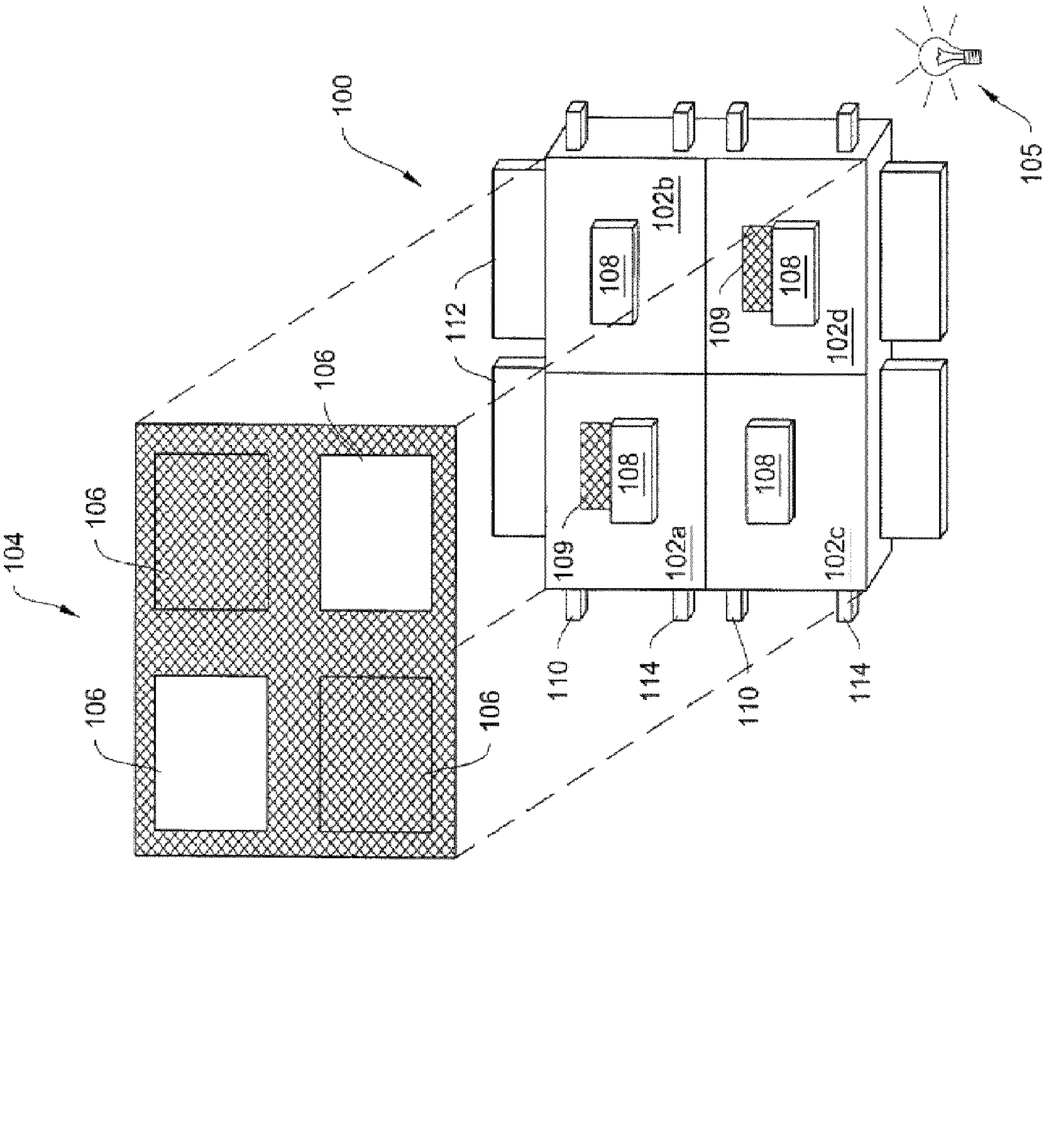
FIG. 1A shows an example schematic diagram of a direct-view MEMS-based display apparatus.

FIG. 1A shows a schematic diagram of a direct-view MEMS-based display apparatus 100. The display apparatus 100 includes a plurality of light modulators 102*a*-102*d* (generally "light modulators 102") arranged in rows and columns. In the display apparatus 100, the light modulators 102*a* and 102*d* are in the open state, allowing light to pass. The light modulators 102*b* and 102*c* are in the closed state, obstructing the passage of light. By selectively setting the states of the light modulators 102*a*-102*d*, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
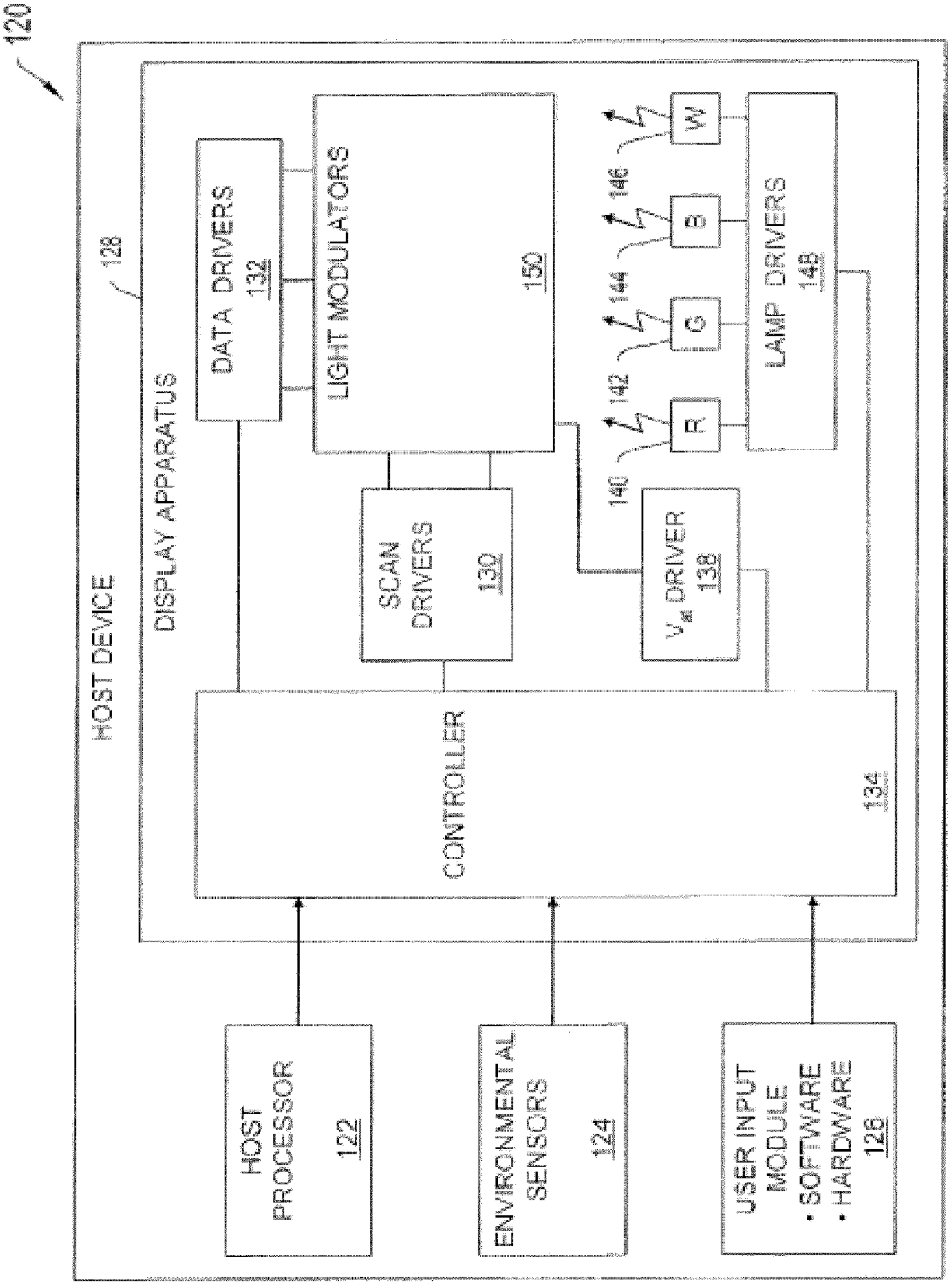
FIG. 1B shows an example block diagram of a host device.

FIG. 1B shows an example of a block diagram 120 of a host device (i.e., cell phone, smart phone, PDA, MP3 player, tablet, e-reader, etc.). The host device includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and light modulators 150. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor may be a general or special purpose processor for controlling a portable electronic device. With respect to the display apparatus 128, included within the host device 120, the host processor outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device. The environmental sensor module receives data about the ambient environment, such as temperature and or ambient lighting conditions. The sensor module 124 can be programmed to distinguish whether the device is operating in an indoor or office environment versus an outdoor environment in bright daylight versus and outdoor environment at nighttime. The sensor module communicates this information to the display controller 134, so that the controller can optimize the viewing conditions in response to the ambient environment.

Figure 2A:
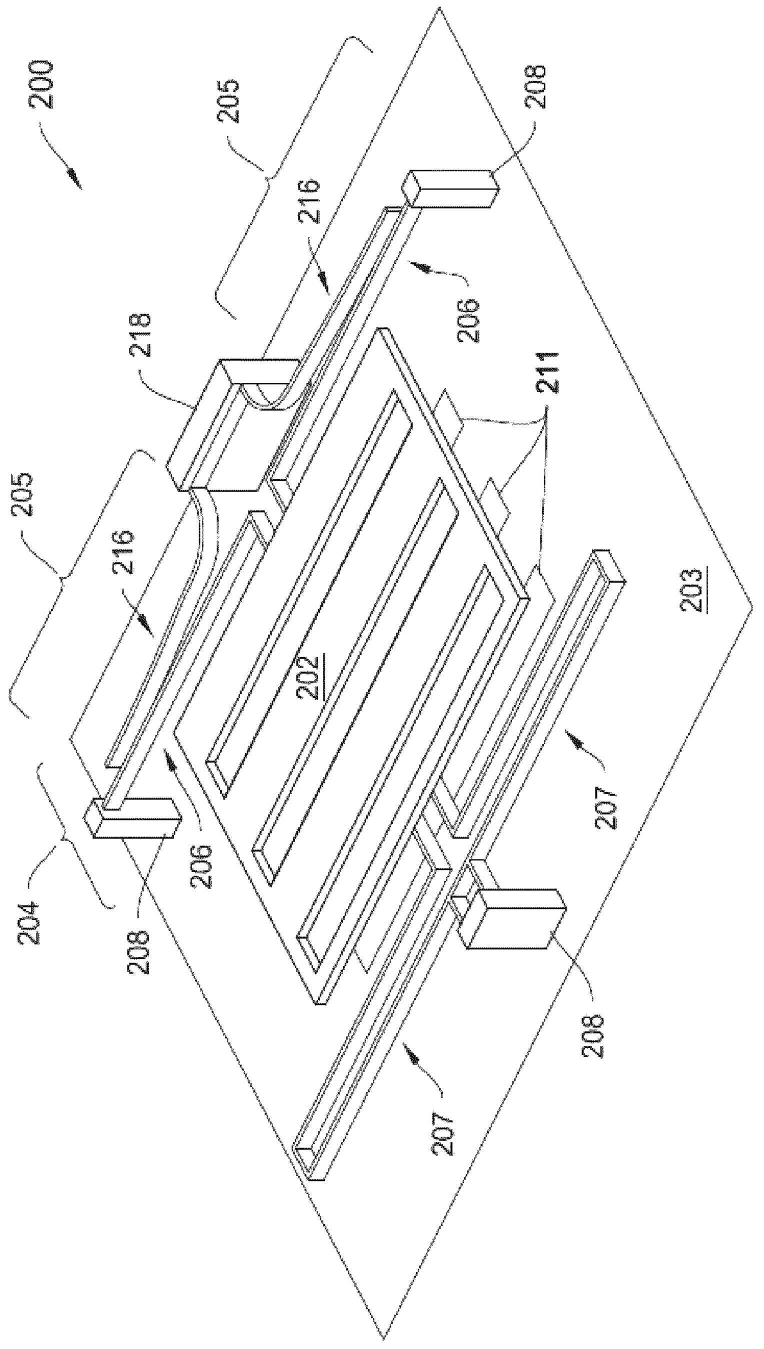
FIG. 2A shows an example perspective view of an illustrative shutter-based light modulator.

FIG. 2A shows a perspective view of an illustrative shutter-based light modulator 200. The shutter-based light modulator is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as light modulator 200, incorporates a passive restoring force, such as a spring, for returning a shutter to its rest position after voltages have been removed. Other shutter assemblies can incorporate a dual set of "open" and "closed" actuators and a separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
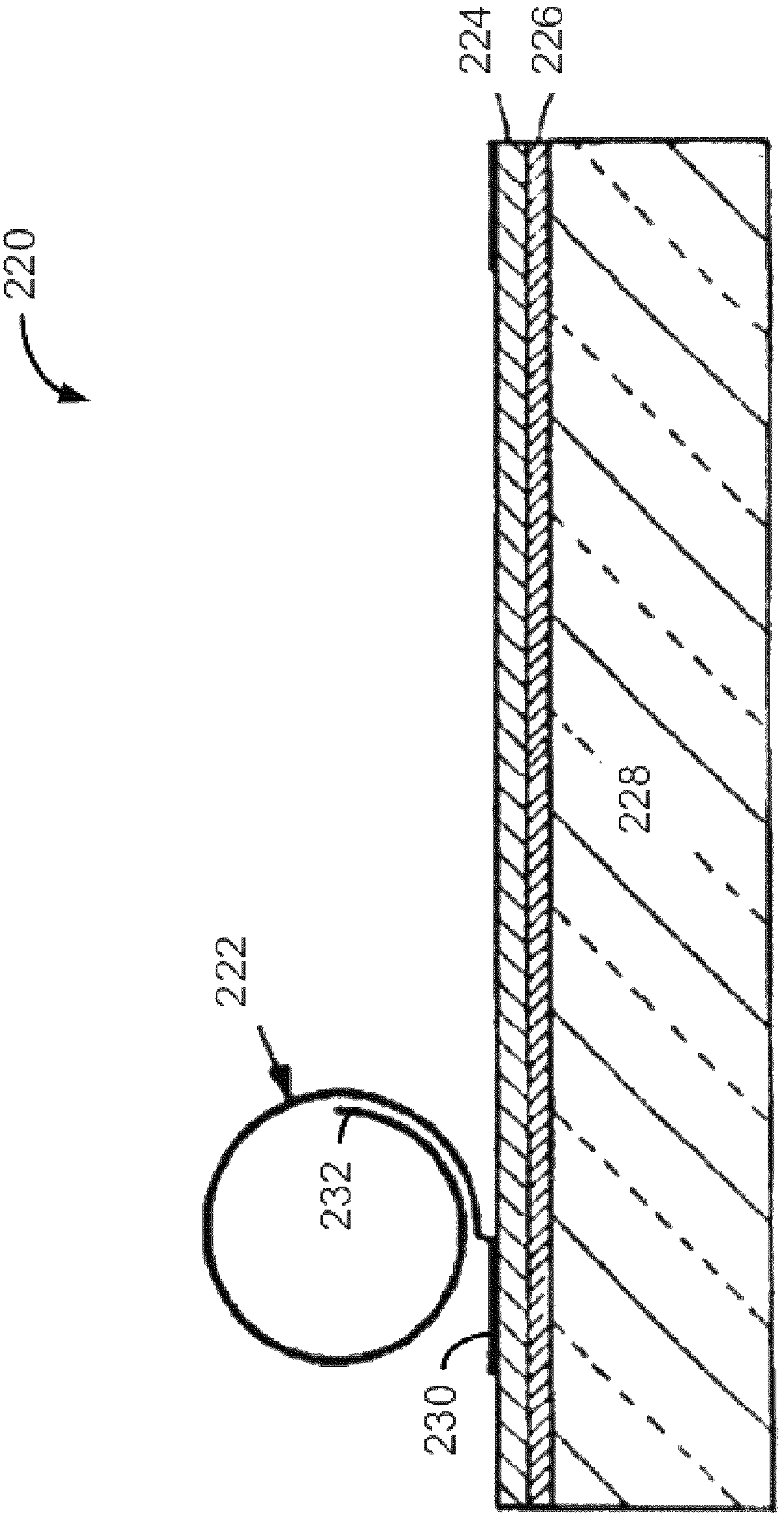
FIG. 2B shows a cross sectional view of a rolling actuator shutter-based light modulator.

The display apparatus 100, in alternative implementations, includes light modulators other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

Figure 2C:
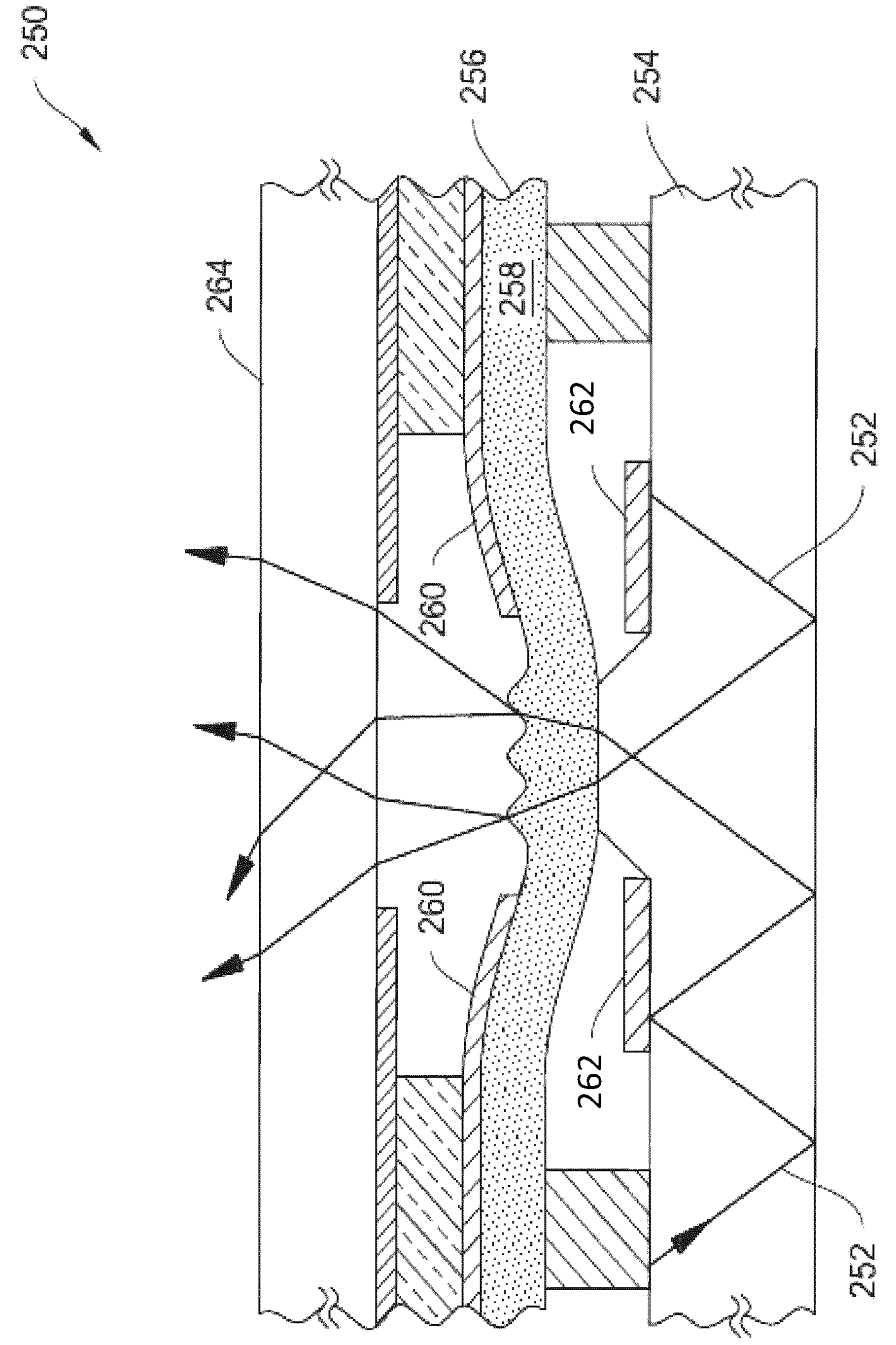
FIG. 2C shows a cross sectional view of an illustrative non shutter-based microelectromechanical systems (MEMS) light modulator.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
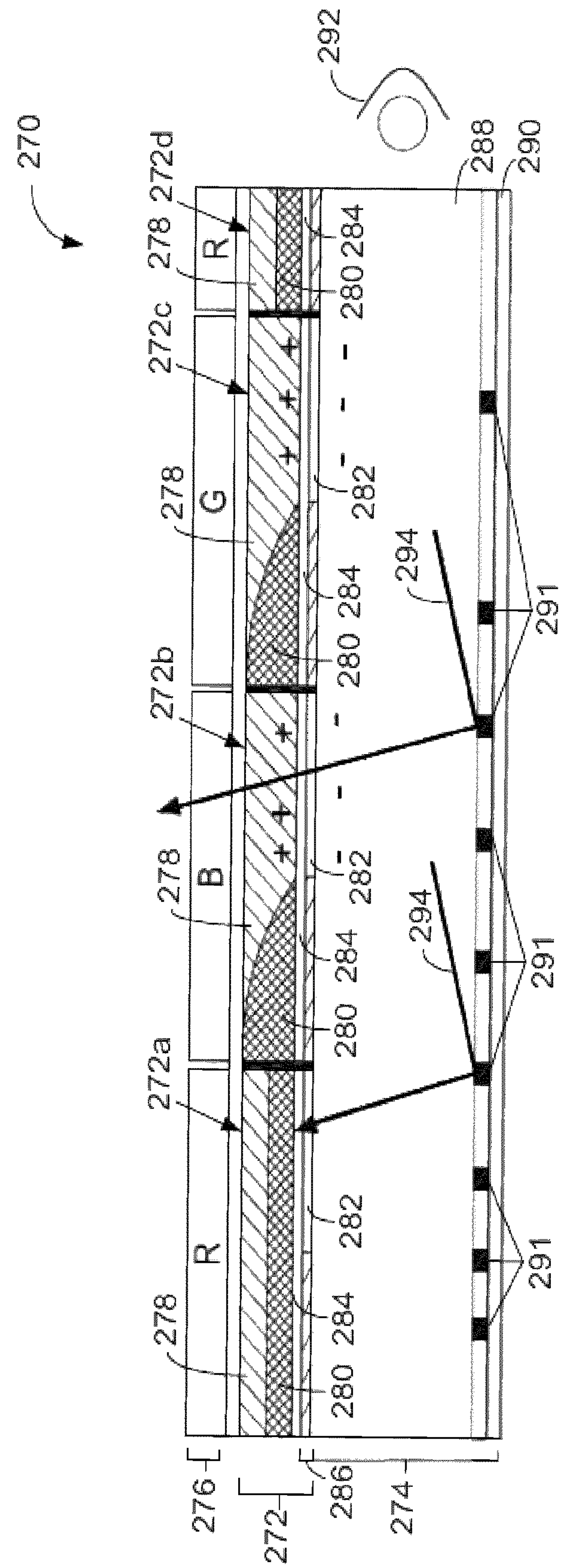
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272*a-d* (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272*b* or 272*c*) causes the light absorbing oil 280 in the cell to collect in one portion of the cell 272. As a result, the light absorbing oil 280 no longer obstructs the passage of light through the aperture formed in the reflective aperture layer 286 (see, for example, cells 272*b* and 272*c*). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
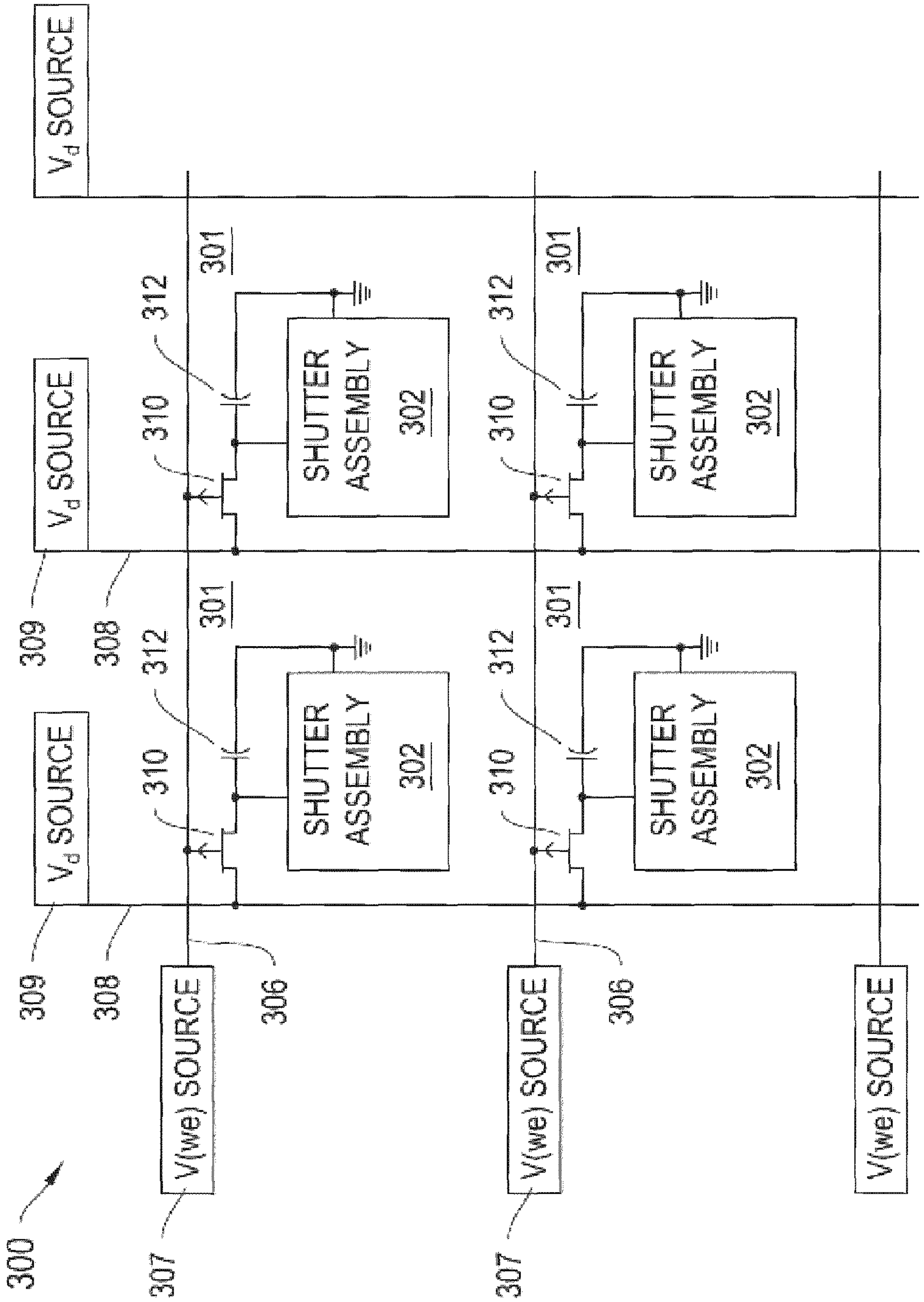
FIG. 3A shows an example schematic diagram of a control matrix.
Figure 3B:
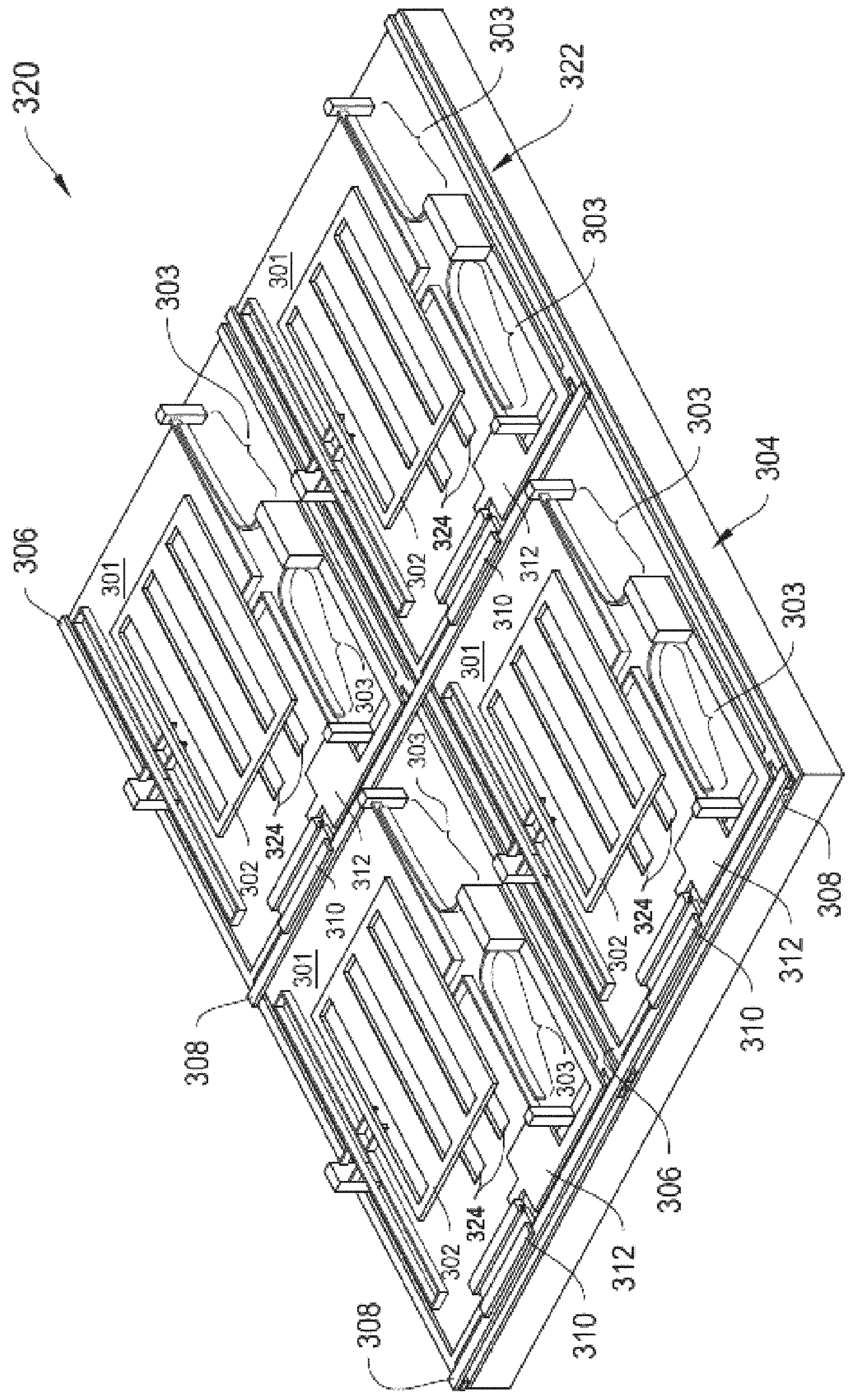
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

Figure 4B:
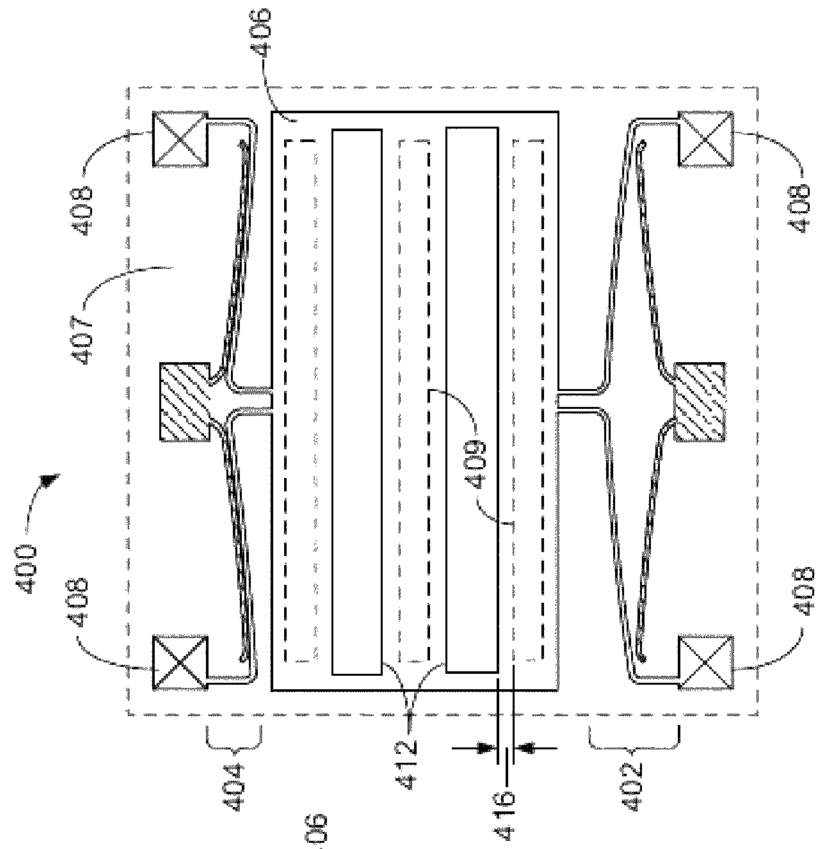
FIGS. 4A and 4B show example views of a dual actuator shutter assembly.
Figure 4A:
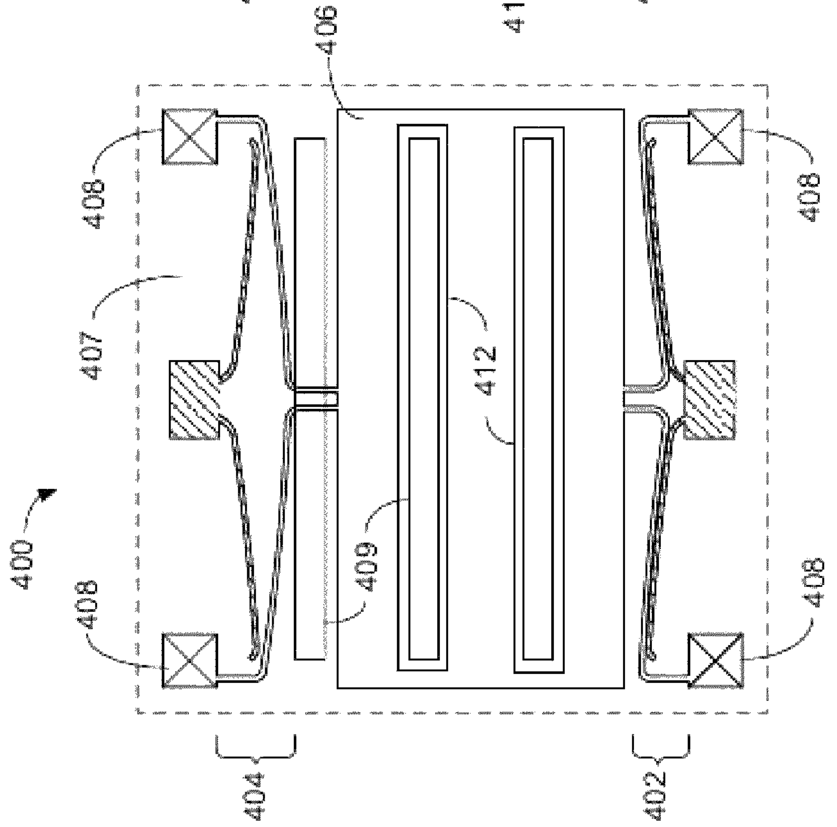

FIGS. 4A and 4B show example views of a dual actuator shutter assembly 400. The dual actuator shutter assembly, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. As will be described below, a variety of different control matrices may be used with the shutter assembly 400.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B, the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators, there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

In certain display apparatus, the control matrix may be made from a substrate having a semiconductor layer, such as amorphous Silicon, low-temperature polysilicon or an oxide layer, such as Indium-gallium-zinc-oxide (InGaZnO), commonly referred to IGZO. The benefit of utilizing a substrate having an IGZO layer instead of layers of amorphous Silicon is the increased electron mobility of IGZO, which increases the speed at which the display can be addressed. Further, a substrate having an IGZO layer may be preferred over low-temperature polysilicon, due to its lower cost of production and higher yield, despite IGZO having a lower mobility than low-temperature polysilicon. However, it is currently difficult to manufacture p-MOS type transistors using IGZO processes. Thus, control matrices made using IGZO typically can only be built with n-MOS transistors.

However, control matrices built using a single type of transistor, for example, only n-MOS transistors, are generally less reliable than desired. To mitigate the unreliability of such control matrices, some control matrices may utilize multiple data or actuation voltage interconnects. This results in significant additional power consumption and decreases available substrate space for light throughput, decreasing the display brightness.

In some implementations, a control matrix that utilizes a substrate having an IGZO layer and includes a single actuation voltage interconnect and two separate update interconnects can help achieve the benefits of using IGZO while mitigating the unreliability of such control matrices and without having to compromise on the additional power consumption. The use of an IGZO layer restricts the control matrix to only utilizing n-MOS transistors. By utilizing two separate update interconnects, each configured to independently control discharge transistors of the circuit, described further below, the control matrix can reliably control the state of the pixel, preventing the pixel from entering in an indeterminate state.

Figure 5:
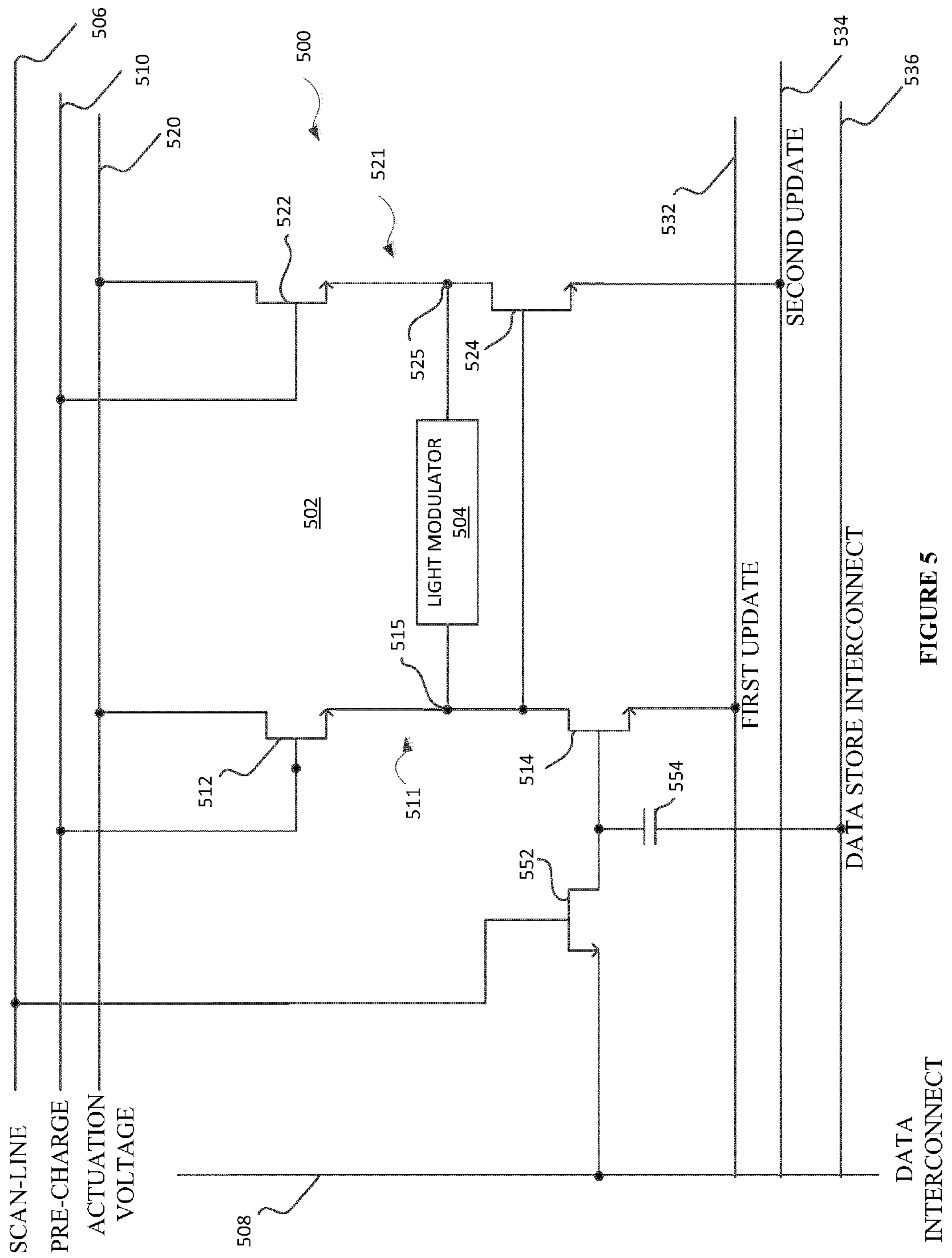
FIG. 5 shows a portion of an example control matrix.

FIG. 5 shows a portion of an example control matrix 500. The control matrix 500 can be implemented for use in the display apparatus 100 depicted in FIG. 1. The structure of the control matrix 500 is described immediately below. Its operation will be described thereafter with respect to FIG. 6.

The control matrix 500 controls an array of pixels 502 that includes MEMS-based light modulators. In some implementations, the MEMS-based light modulators may be shutter-based light modulators that include at least one shutter assembly, such as the shutter assembly 200 depicted in FIG. 2A.

The control matrix 500 includes a scan-line interconnect 506 for each row of pixels 502 in the display apparatus 100 and a data interconnect 508 for each column of pixels 502. The scan-line interconnect 506 is configured to allow data to be loaded onto the pixel 502. The data interconnect 508 is configured to provide a data voltage corresponding to the data to be loaded on to the pixel 502. Further, the control matrix 500 includes a pre-charge interconnect 510, an actuation voltage interconnect 520, a first update interconnect 532, a second update interconnect 534 and a data store interconnect 536 (collectively referred to as "common interconnects"). These common interconnects 510, 520, 532, 534 and 536 are shared among pixels 502 in multiple rows and multiple columns in the array. In some implementations, the common interconnects 510, 520, 532, 534 and 536 are shared among all pixels 502 in the display apparatus 100.

Each pixel 502 in the control matrix 500 also includes a write-enable transistor 552 and a data store capacitor 554. The gate of the write-enable transistor 552 is coupled to the scan-line interconnect 506 such that the scan-line interconnect 506 controls the write-enable transistor 552. The source of the write-enable transistor 552 is coupled to the data interconnect 508 and the drain of the write-enable transistor 552 is coupled to a first terminal of the data store capacitor 554 and a first state inverter 511 described below. A second terminal of the data store capacitor 554 is coupled to the data store interconnect 536. In this way, as the write-enable transistor 552 is switched on via a write-enabling voltage provided by the scan-line interconnect 506, a data voltage provided by the data interconnect 508 passes through the write-enable transistor 552 and is stored at the data store capacitor 554. The stored data voltage is then used to drive the pixel 502 to one of a first pixel state or second pixel state.

The control matrix 500 also includes a dual-actuation light modulator 504 that can be driven between a first pixel state and a second pixel state. The light modulator 504 is driven to the first pixel state by a first actuator coupled to a first actuation node 515, while the light modulator 504 can be driven to the second pixel state by a second actuator coupled to a second actuation node 525. The control matrix 500 further includes a circuit including a first state inverter 511 and a second state inverter 521. The first state inverter 511 governs the voltage at the first actuation node 515 and includes a first charge transistor 512 coupled to a first discharge transistor 514 at the first actuation node 515. The second state inverter 521 governs the voltage at the second actuation node 525 and includes a second charge transistor 522 coupled to a second discharge transistor 524 at the second actuation node 525.

The gate of the first charge transistor 512 is connected to the pre-charge interconnect 510, while the drain of the first charge transistor 512 is connected to the actuation voltage interconnect 520. The source of the first charge transistor 512 is coupled to the drain of the of the first discharge transistor 514 at the first actuation node 515. The gate of the first discharge transistor 514 is connected to the drain of the write-enable transistor 552 and one end of the data store capacitor 554. The source of the first discharge transistor is coupled to the first update interconnect 532.

The gate of the second charge transistor 522 is also connected to the pre-charge interconnect 510. The drain of the second charge transistor 522 is connected to the actuation voltage interconnect 520. The source of the second charge transistor 522 is coupled to the drain of the second discharge transistor 524 at the second actuation node 525. The gate of the second discharge transistor 524 is coupled to the first actuation node 515. The source of the second discharge transistor 524 is coupled to the second update interconnect 534.

Figure 8:
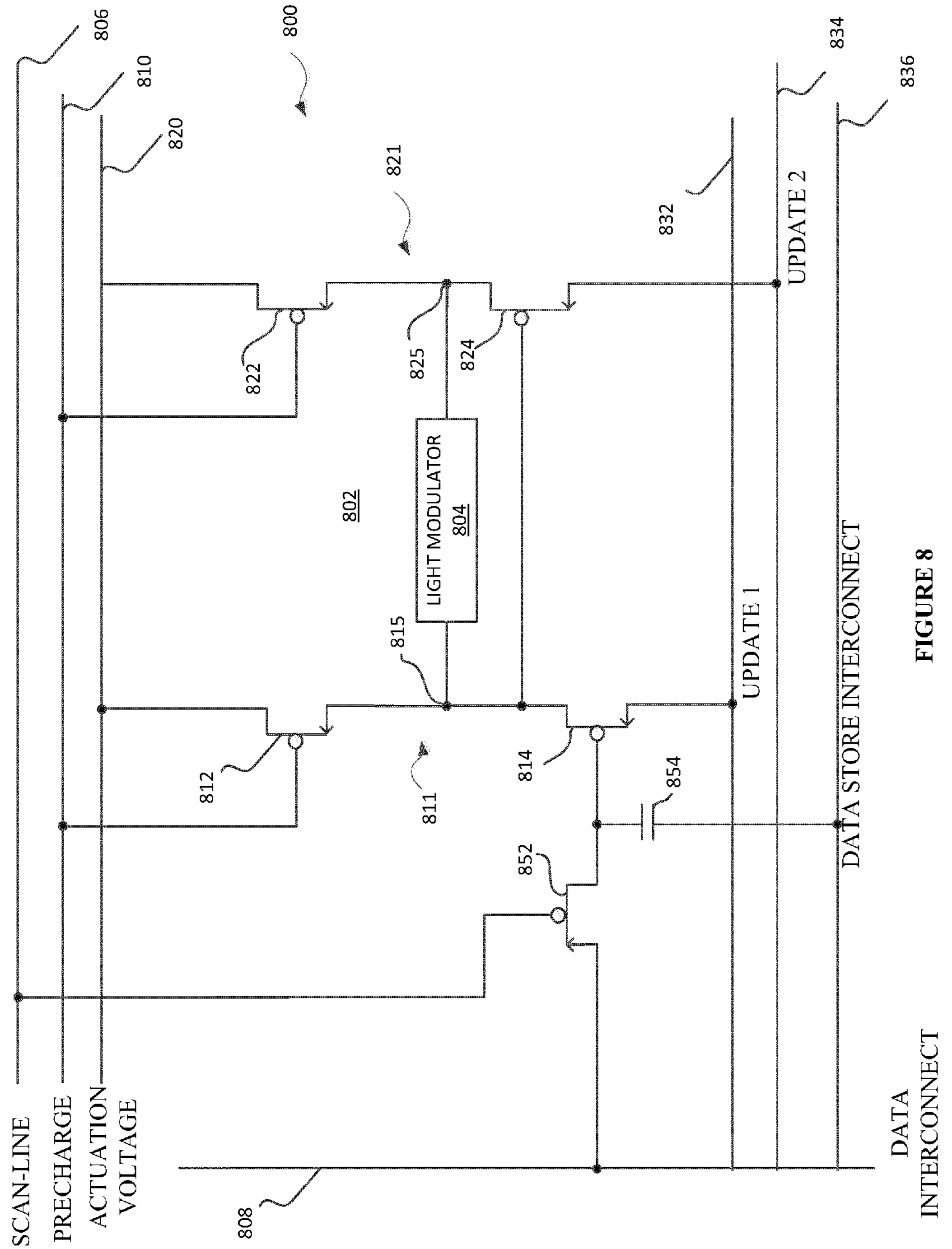
FIG. 8 shows a portion of another example control matrix.

The first update interconnect 532, along with the voltage stored on the data store capacitor 554, controls the voltage at the first actuation node 515 via the first discharge transistor 514. The second update interconnect 534 controls the voltage at the second actuation node 525 via the second discharge transistor 524. Each of the transistors 512, 514, 522, 524 and 552 are n-MOS transistors. As described above, circuits formed from only one-type of transistors are particularly useful in more recent Indium Gallium Zinc Oxide (IGZO) manufacturing processes, especially where p-type transistors are difficult to build. Alternatively, a control matrix could be designed with all p-type transistors. FIG. 8, which will be described in detail later, depicts one implementation of a control matrix 800 that includes only p-MOS transistors.

Figure 6:
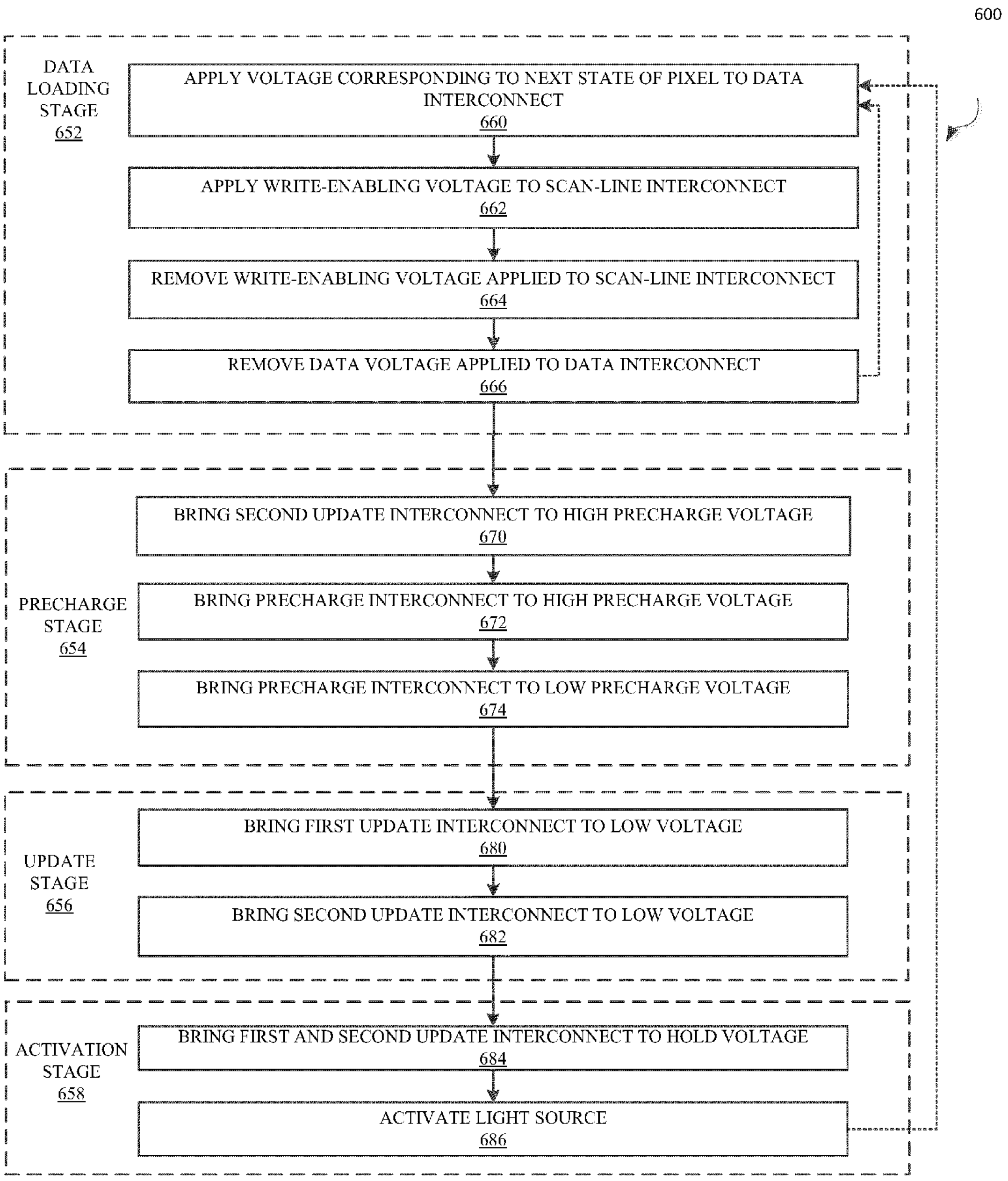
FIG. 6 shows a flow diagram of an example frame addressing and pixel actuation method.

FIG. 6 shows a flow diagram of an example frame addressing and pixel actuation method 600. The method 600 may be employed, for example, to operate the control matrix 500 of FIG. 5. The frame addressing and pixel actuation method 600 proceeds in four general stages. First, data voltages for pixels in a display are loaded for each pixel one row at a time in a data loading stage (block 652). Next, in a precharge stage, the actuation nodes coupled to the light modulator are charged (block 654). Next, in an update stage, the voltages pre-loaded on the first update interconnect and the second update interconnect are modified causing the light modulator to assume an updated state (block 656). Upon the light modulator assuming an updated state, the light source is activated in a light activation stage (block 658).

Figure 7:
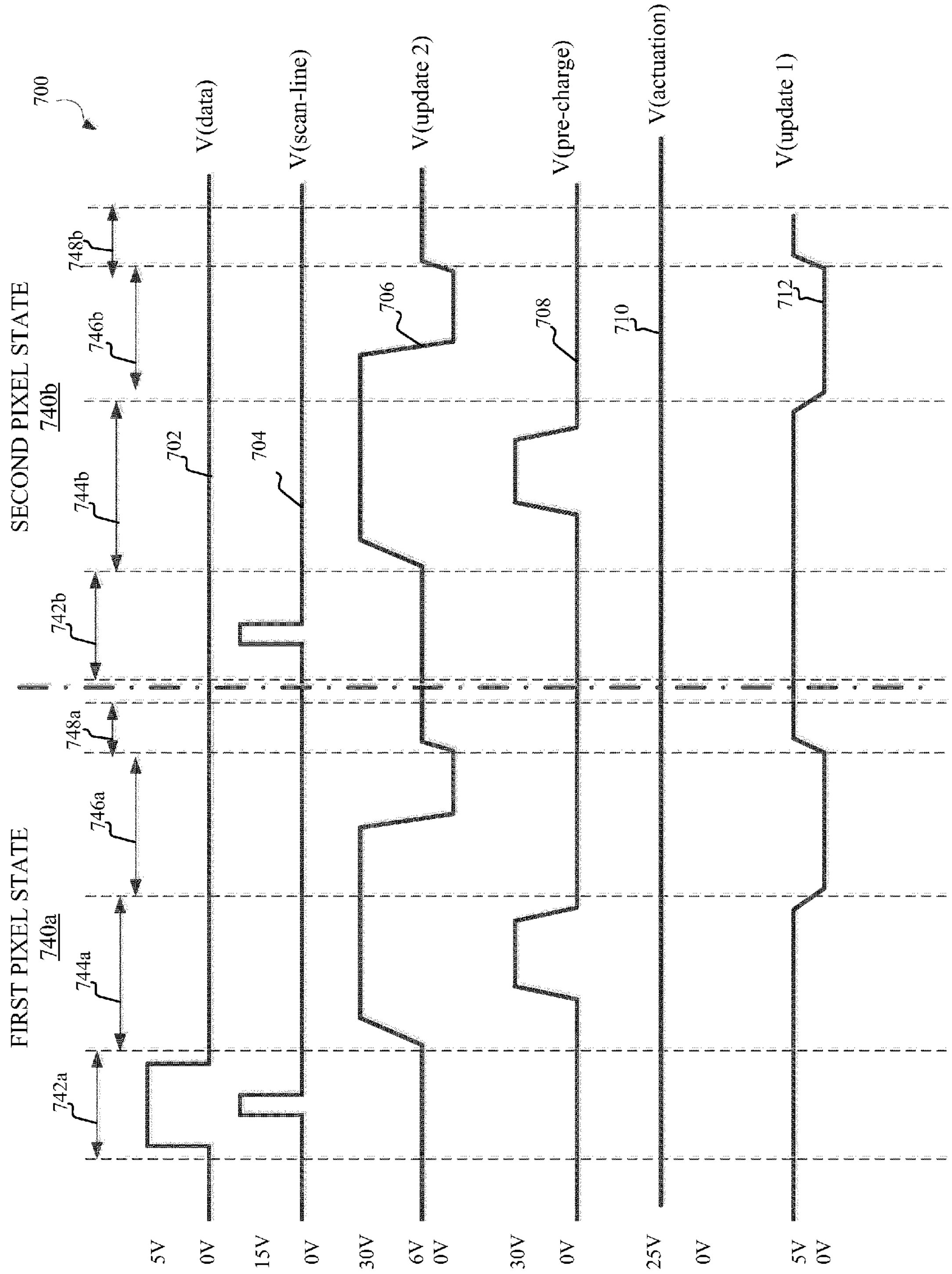
FIG. 7 shows a timing diagram of example voltages applied to various interconnects of a control matrix.

Details of the various stages of the frame addressing and pixel actuation method 600 will be described with reference to a timing diagram depicted in FIG. 7. FIG. 7 shows a timing diagram 700 of example voltages applied to various interconnects of a control matrix. The timing diagram 700 may be employed, for example, to operate the control matrix 500 of FIG. 5 according to the frame addressing and pixel actuation method 600 depicted in FIG. 6.

In particular, the timing diagram 700 includes separate timing graphs indicating the voltages at various interconnects during the various stages of the frame addressing and pixel actuation method 600 employed by the control matrix 500. The timing diagram includes a timing graph 702 indicating the voltage applied at the data interconnect 508, a timing graph 704 indicating the voltage at the scan-line interconnect 506, a timing graph 706 indicating the voltage at the second global update interconnect 534, a timing graph 708 indicating the voltage applied to the pre-charge interconnect 510, a timing graph 710 indicating the voltage applied to the actuation voltage and a timing graph 712 indicating the voltage applied to the first global update interconnect 532.

Further, the timing diagram 700 is separated into a first region 740*a* corresponding to a first pixel state and a second region 740*b* corresponding to a second pixel state. Both the first and second regions 740*a* and 740*b* include portions corresponding to the various stages of the frame addressing and pixel actuation method 600 shown in FIG. 6. Each of the first and second regions 740*a* and 740*b* include corresponding data load portions 742*a* and 742*b* that correspond to the data loading stage 652, precharging portions 744*a* and 744*b* that correspond to the precharging stage 654, update portions 746*a* and 746*b* that correspond to the update stage 656 and activation portions 748*a* and 748*b* that correspond to the light activation stage 658. It should be appreciated that the timing diagram is not drawn to scale and that the relative lengths and widths of each of the timing graphs are not intended to indicate particular voltages or durations of time. Furthermore, the voltage levels shown in FIG. 7 are for illustrative purpose only. One of skill in the art should understand that other voltage levels can be used in different implementations.

Referring now to the frame addressing and pixel actuation method 600 depicted in FIG. 6 with references being made to the control matrix 500 depicted in FIG. 5 and the timing diagram 700 depicted in FIG. 7, the data loading stage (block 652) corresponds to the data loading portions 742*a* and 742*b* of the timing diagram 700. The frame addressing and pixel actuation method 600 begins with the data loading stage (block 652) for addressing each of the pixels of a particular row of the array. The data loading stage (block 652) proceeds with applying a data voltage corresponding to a next pixel state of the pixel (block 660). The next pixel state may be a first pixel state corresponding to a light transmissive state or a second pixel state corresponding to a light blocking state. In some implementations, a data voltage that is high corresponds to a first pixel state. This is depicted in the portion 742*a* of the timing graph 702. In some implementations, a data voltage that is low corresponds to a second pixel state. This is depicted in the portion 742*b* of the timing graph 702.

The data loading stage (block 652) then proceeds with applying a write-enabling voltage $V_{we}$ to the scan-line interconnect 506 corresponding to the row (block 662) such that the scan-line interconnect 506 is write-enabled. The application of a write-enabling voltage $V_{we}$ to the scan-line interconnect 506 for the write-enabled row turns ON the write-enable transistors, such as write-enable transistor 552, of all pixels in the row.

Upon applying the write-enabling voltage to the scan-line interconnect 506 (block 662), the data voltage $V_d$ applied to the data interconnect 508 is caused to be stored as a charge on the data store capacitor 554 of the selected pixel 502. That is, because the write-enable transistor 552 is switched ON when the data voltage $V_d$ is applied to the data interconnect 508, the data voltage $V_d$ passes through the write-enable transistor 552 to the data store capacitor 554 on which it is loaded or stored as a charge.

The process of loading data can be performed simultaneously in each of the pixels in the row that is write-enabled. In this way, the control matrix 500 selectively applies the data voltage to columns of a given row in the control matrix 500 at the same time while that row has been write-enabled. In some implementations, the control matrix 500 only applies the data voltage to those columns that are to be actuated towards one of the first and second pixel states. Once all the pixels in the row are addressed, the write-enabling voltage applied to the scan-line interconnect 506 is removed (block 664). In some implementations, the scan-line interconnect 506 is grounded. This is depicted in the portion 742*a* of the timing graph 704. The data voltage applied to the data interconnect 508 is then also removed from the data voltage interconnect 508 (block 666). This is depicted in the portion 742*a* of the timing graph 702 if the data voltage applied to the data interconnect 508 is high and conversely, depicted in the portion 742*b* of the timing graph 702 if the data voltage applied to the data interconnect 508 is low. The data loading stage (block 652) is then repeated for subsequent rows of the array in the control matrix 500. At the end of the data loading stage (block 652), each of the data store capacitors in the selected group of pixels contains the data voltage which is appropriate for the setting of the next image state.

The control matrix 500 then proceeds with the precharge stage (block 654) where the second update interconnect 534 is brought to a high precharge voltage (block 670). This is depicted in portions 744*a* and 744*b* of the timing graph 706. In some implementations, the precharge voltage ranges from about 12V-40V. In some implementations, the high precharge voltage may correspond to an actuation voltage applied to the actuation voltage interconnect 520. In some implementations, the second update interconnect 534 is brought to the high precharge voltage such that the second discharge transistor 524 remains switched OFF. In some implementations, the second update interconnect 534 may be brought to any voltage that is sufficient to keep the second discharge transistor 524 switched OFF while the first and second actuation nodes 515 and 525 are precharged.

Upon bringing the second update interconnect 534 to the high precharge voltage, the precharge interconnect 510 is brought to a high precharge voltage (block 672). In some implementations, the precharge voltage ranges from about 12V-40V. In some implementations, the precharge interconnect 510 is brought to precharge voltage that corresponds to the high actuation voltage applied to the second update interconnect 534. Generally, a precharge voltage capable of switching on the first charge transistor 512 and the second charge transistor 522 is sufficient. This is depicted in portions 744*a* and 744*b* of the timing graph 708.

Upon bringing the precharge interconnect 510 to the high precharge voltage, the actuation voltage applied to the actuation voltage interconnect 520 causes the first actuation node 515 and the second actuation node 525 to be brought to the actuation voltage. In this way, the first actuation node 515 and the second actuation node 525 are said to be 'precharged'. In some implementations, the actuation voltage interconnect 520 is maintained at a voltage that corresponds to the high precharge voltage applied to the precharge interconnect 510. In some implementations, the maximum actuation voltage may be smaller than the maximum precharge voltage to account for the diode drop of the charge transistors 512 and 522. In some implementations, the actuation voltage interconnect 520 is maintained at about 25V-40V.

Upon precharging the first actuation node 515 and the second actuation node 525, the precharge interconnect 510 is also brought to a low voltage (block 674). In some implementations, the precharge interconnect 510 voltage is brought to ground. In some implementations, the precharge interconnect 510 remains at a high voltage for approximately 10-30 μs. In some implementations, the precharge interconnect 510 remains at a high voltage for a period longer than 30 μs. This is depicted in portions 744*a* and 744*b* of the timing graph 708.

Upon precharging the first actuation node 515 and the second actuation node 525, the control matrix 500 proceeds with the update stage (block 656). In this stage, the first update interconnect 532 is brought to a low voltage (block 680). In some implementations, the first update interconnect 532 is connected to ground. The change in the voltage applied to the first update interconnect 532 is depicted in the portions 746*a* and 746*b* of the timing graph 712. If the data voltage stored on the data store capacitor 554 is high, corresponding to the first pixel state, the first discharge transistor 514 is switched ON upon bringing the first update interconnect 532 to a low voltage state. As a result, the voltage at the first actuation node 515 is brought to a low voltage. Conversely, if the data voltage stored on the data store capacitor 554 is low corresponding to the second pixel state, the first discharge transistor 514 remains switched OFF upon bringing the first update interconnect 532 to the low voltage. As a result, the voltage at the first actuation node 515 remains in a high voltage state.

After the first update interconnect 532 is brought to a low voltage (block 680), the second update interconnect 534 is brought to a low voltage (block 682). The change in the voltage applied to the second update interconnect 534 is depicted in the portions 746*a* and 746*b* of the timing graph 706. In some implementations, the second update interconnect 534 is connected to ground. In some implementations, the second update interconnect 534 is held at a high voltage long enough for the first actuation node 515 to settle in response to lowering the first update interconnect 532. In some implementations, the low voltage state may correspond to a voltage that is sufficient to switch the second discharge transistor 524 from an OFF state to an ON state, provided the first actuation node 515 is at a high voltage state. If the first actuation node 515 is brought to a low voltage corresponding to the first pixel state, the second discharge transistor 524 remains switched OFF upon bringing the second update interconnect 534 to a low voltage. As a result, the voltage at the second actuation node 525 remains at a high voltage. Conversely, if the first actuation node 515 remains at a high voltage state corresponding to the second pixel state, the second discharge transistor 524 is switched ON upon bringing the second update interconnect 534 to the low voltage state. As a result, the voltage at the second actuation node 525 is brought to a low voltage state. In this way, the voltage at the first actuation node 515 and the voltage at the second actuation node 525 are complementary. This is because the control matrix 500 is symmetric. That is, the input of the first state inverter and the input of the second state inverter are configured to receive complementary data inputs.

Based on the relative voltage states at the first actuation node 515 and the second actuation node 525, the light modulator 504 assumes either a first pixel state or a second pixel state. In some implementations, the light modulator 504 can assume the first pixel state when the first actuation node 515 is at a low voltage state, while the second actuation node 525 is at a high voltage state. Conversely, the light modulator 504 can assume the second pixel state when the first actuation node 515 is at a high voltage state, while the second actuation node 525 is at a low voltage state. In some implementations, the light modulator 504 may include a shutter. In such implementations, during the update stage 656, the shutter can either remain in a previous pixel state or be actuated to assume a new pixel state.

Once the actuator of the light modulator 504 is stable in its desired state, the control matrix 500 proceeds with the light activation stage 658. The light activation stage proceeds with bringing the first update interconnect 532 and the second update interconnect 534 to a hold voltage (block 684). The hold voltage is typically equal to the voltage being applied to the gate terminal of the first discharge transistor 514 and the second discharge transistor 524. In this way, the first discharge transistor 514 and the second discharge transistor 524 can be switched OFF as the control matrix 500 prepares for the data loading stage corresponding to the next pixel state. In some implementations, the second update interconnect 534 is brought to the holding voltage state after the light modulator 504 has settled in the pixel state corresponding to the data voltage.

Upon bringing the first update interconnect 532 and the second update interconnect 534 to a holding voltage state, the control matrix 500 proceeds with activating one or more light sources (block 686). The light activation portions 748*a* and 748*b* of the timing diagram 700 correspond to the light activation stage (block 658). During the light activation stage, all of the voltages applied to the various interconnects may be held, as depicted in the portions 748*a* and 748*b* of the timing diagram 700. Upon activating the light source (block 686), the frame addressing and pixel actuation method 600 can be repeated by returning to the data loading stage (block 652).

In some implementations, the control matrix 500 can be realized as a CMOS circuit. In some such implementations, the first charge transistor 512 and the second charge transistor 522 can be PMOS transistors. In such implementations, the precharge interconnect can be maintained at a high actuation voltage, keeping the PMOS transistors switched OFF. The precharge voltage applied to the precharge interconnect can then be dropped below the actuation voltage, for example, 5V below the actuation voltage, to switch ON the PMOS transistors. In this way, the first actuation node 515 and the second actuation node 525 can be precharged. By utilizing PMOS charge transistors, power savings can be achieved. This is because the voltage applied to the precharge interconnect 510 used to switch ON the PMOS charge transistors can be smaller than the voltage needed to switch ON corresponding NMOS charge transistors, such as the first charge transistor 512 and the second charge transistor 522.

FIG. 8 shows a portion of another example control matrix 800. The control matrix 800 can be implemented for use in the display apparatus 100 depicted in FIG. 1. The structure of the control matrix 800 is substantially similar to that of the control matrix 500 depicted in FIG. 5. The control matrix 800 differs from the control matrix 500 in the type of transistors being used. In particular, the control matrix 800 utilizes p-MOS transistors, while the control matrix 500 utilizes n-MOS transistors. The operation of the control matrix 800 will be described with respect to FIG. 9.

The control matrix 800 controls an array of pixels 802 that includes MEMS-based light modulators. In some implementations, the MEMS-based light modulators may be shutter-based light modulators that include at least one shutter assembly, such as the shutter assembly 200 depicted in FIG. 2A.

The control matrix 800 includes a scan-line interconnect 806 for each row of pixels 802 in the display apparatus 100 and a data interconnect 808 for each column of pixels 802. The scan-line interconnect 806 is configured to allow data to be loaded onto the pixel 802. The data interconnect 808 is configured to provide a data voltage corresponding to the data to be loaded on to the pixel 802. Further, the control matrix 800 includes a pre-charge interconnect 810, an actuation voltage interconnect 820, a first update interconnect 832, a second update interconnect 834 and a data store interconnect 836 (collectively referred to as "common interconnects"). These common interconnects 810, 820, 832, 834 and 836 are shared among pixels 802 in multiple rows and multiple columns in the array. In some implementations, the common interconnects 810, 820, 832, 834 and 836 are shared among all pixels 802 in the display apparatus 100.

In some implementations, each pixel 802 in the control matrix 800 also includes a write-enable transistor 852 and a data store capacitor 854. The gate of the write-enable transistor 852 is coupled to the scan-line interconnect 806 such that the scan-line interconnect 806 controls the write-enable transistor 852. The source of the write-enable transistor 852 is coupled to the data interconnect 808 and the drain of the write-enable transistor 852 is coupled to a first terminal of the data store capacitor 854 and a first inverter 811 described below. A second terminal of the data store capacitor 854 is coupled to the data store interconnect 836. In this way, as the write-enable transistor 852 is switched ON via a write-enabling voltage provided by the scan-line interconnect 806, a data voltage provided by the data interconnect 808 passes through the write-enable transistor 852 and is stored at the data store capacitor 854. The stored data voltage is then used to drive the pixel 802 to one of a first pixel state or second pixel state.

The control matrix 800 also includes a dual-actuation light modulator 804 that can be driven between a first pixel state and a second pixel state. The light modulator 804 is driven to the first pixel state by a first actuator coupled to a first actuation node 815, while the light modulator 804 can be driven to the second pixel state by a second actuator coupled to a second actuation node 825. The control matrix 800 further includes a circuit including a first state inverter 811 and a second state inverter 821. The first state inverter 811 governs the voltage at the first actuation node 815 and includes a first charge transistor 812 coupled to a first discharge transistor 814 at the first actuation node 815. The second state inverter 821 governs the voltage at the second actuation node 825 and includes a second charge transistor 822 coupled to a second discharge transistor 824 at the second actuation node 825.

The gate of the first charge transistor 812 is connected to the pre-charge interconnect 810, while the drain of the first charge transistor 812 is connected to the actuation voltage interconnect 820. The source of the first charge transistor 812 is coupled to the drain of the first discharge transistor 814 at the first actuation node 815. The gate of the first discharge transistor 814 is connected to the drain of the write-enable transistor 852 and one end of the data store capacitor 854. The source of the first discharge transistor 814 is coupled to the first update interconnect 832.

The gate of the second charge transistor 822 is connected to the pre-charge interconnect 810, while the drain of the second charge transistor 822 is connected to the actuation voltage interconnect 820. The source of the second charge transistor 822 is coupled to the drain of the second discharge transistor 824 at the second actuation node 825. The gate of the second discharge transistor 824 is coupled to the first actuation node 811. The source of the second discharge transistor 812 is coupled to the second update interconnect 834.

The first update interconnect 832, along with the voltage stored on the data store capacitor 854, controls the voltage at the first actuation node 815 via the first discharge transistor 814. The second update interconnect 834 controls the voltage at the second actuation node 825 via the second discharge transistor 824. Each of the transistors 812, 814, 822, 824 and 852 are p-MOS transistors.

Figure 9:
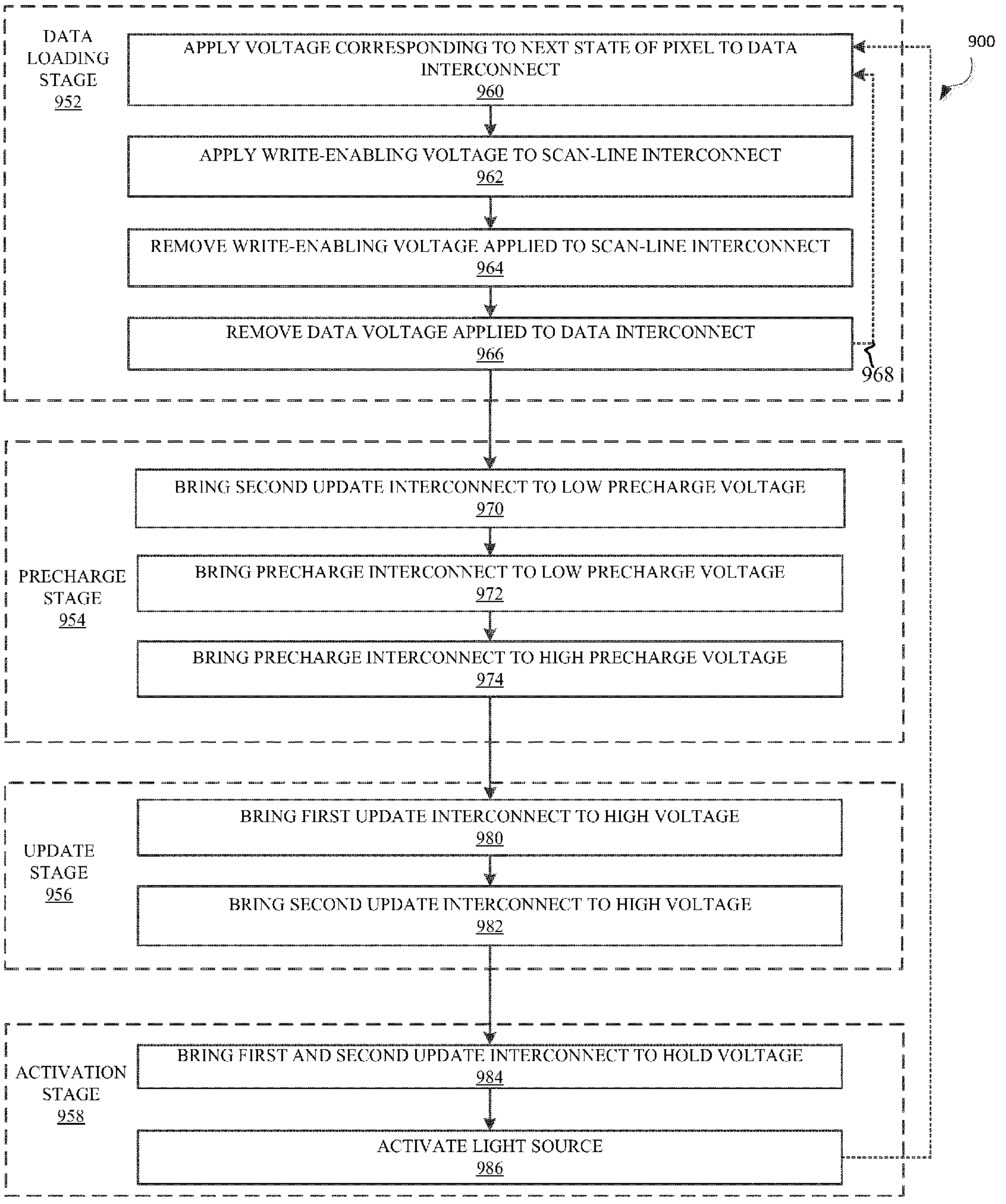
FIG. 9 shows a flow diagram of an example frame addressing and pixel actuation method.

FIG. 9 shows a flow diagram of an example frame addressing and pixel actuation method 900. The method 900 may be employed, for example, to operate the control matrix 800 of FIG. 8. The frame addressing and pixel actuation method 900 is substantially similar to the frame addressing and pixel actuation method 600 depicted in FIG. 6. The frame addressing and pixel actuation method 900 proceeds in four general stages. First, various interconnects of the control matrix are pre-loaded with voltages (block 952). Next, data voltages for pixels in a display are loaded for each pixel one row at a time in a data loading stage (block 954). Next, in an update stage, the voltages pre-loaded on the first update interconnect and the second update interconnect are modified causing the light modulator to assume an updated state (block 956). Upon the light modulator assuming an updated state, the light source is activated in a light activation stage (block 958).

Figure 10:
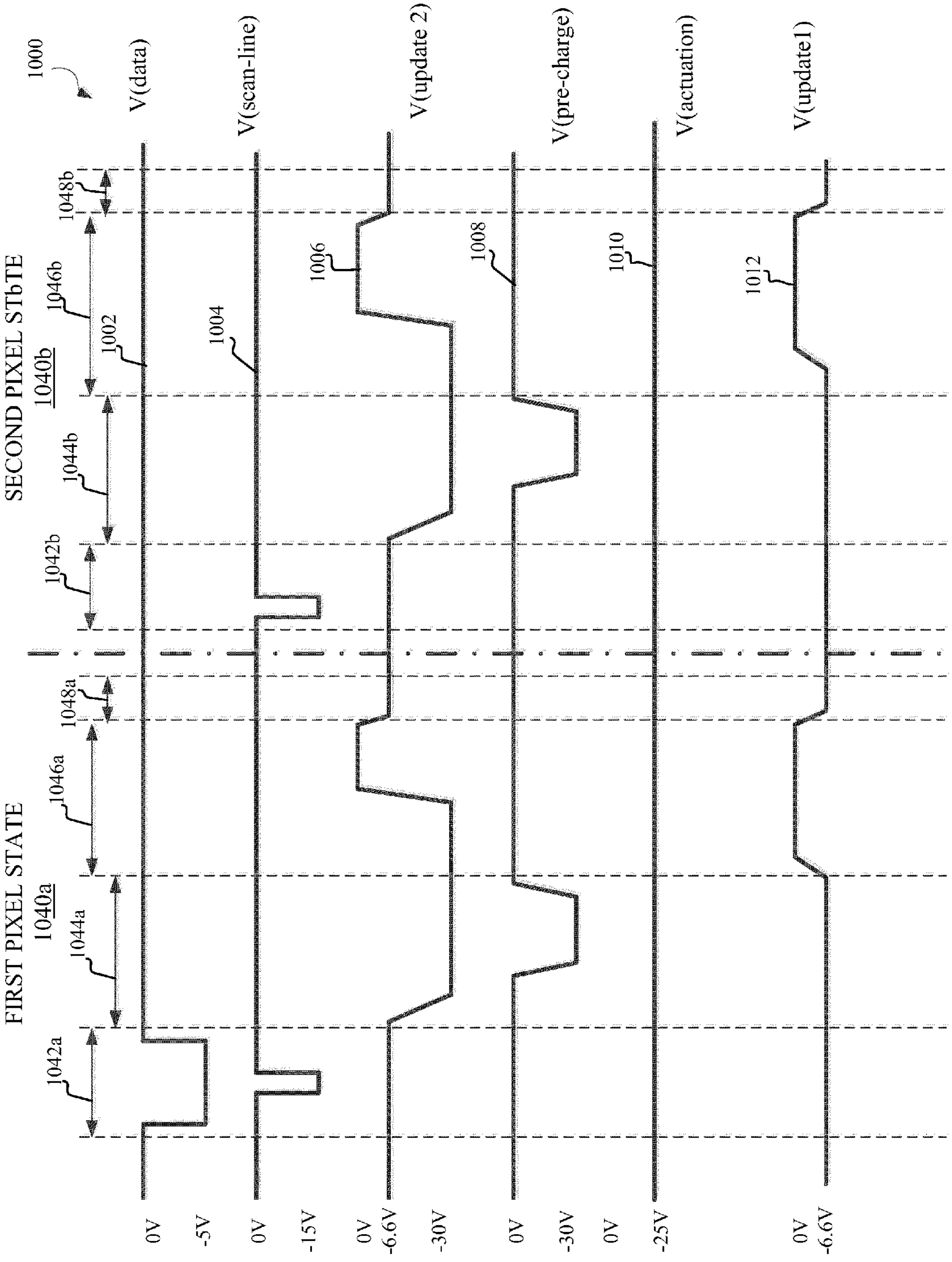
FIG. 10 shows a timing diagram of example voltages applied to various interconnects of a control matrix.

Details of the various stages of the frame addressing and pixel actuation method 900 will be described with reference to a timing diagram depicted in FIG. 10. FIG. 10 shows a timing diagram 1000 of example voltages applied to various interconnects of a control matrix. The timing diagram 1000 may be employed, for example, to operate the control matrix 800 of FIG. 8 according to the frame addressing and pixel actuation method 900 depicted in FIG. 9.

In particular, the timing diagram 1000 includes separate timing graphs indicating the voltages at various nodes and interconnects during the various stages of the frame addressing and pixel actuation method 900 employed by the control matrix 800 as depicted in FIG. 9. The timing diagram 1000 includes a timing graph 1002 indicating the voltage applied at the actuation voltage interconnect 820, a timing graph 1004 indicating the voltage applied to the scan-line interconnect 806, a timing graph 1006 indicating the voltage applied to the data interconnect 808, a timing graph 1008 indicating the voltage applied to the pre-charge interconnect 810, a timing graph 1010 indicating the voltage at the first actuation node 815 and a timing graph 1012 indicating the voltage at the second actuation node 825, a timing graph 1014 indicating the voltage applied to the first global update interconnect 832 and a timing graph 1016 indicating the voltage applied to the second global update interconnect 834.

Further, the timing diagram 1000 is separated into a first region 1040*a* corresponding to a first pixel state and a second region 1040*b* corresponding to a second pixel state. Both the first and second regions 1040*a* and 1040*b* include portions corresponding to the various stages of the frame addressing and pixel actuation method 900. Each of the first and second regions 1040*a* and 1040*b* include corresponding pre-load portions 1042*a* and 1042*b* that correspond to the pre-loading stage 952, data loading portions 1044*a* and 1044*b* that correspond to the data loading stage 954, update portions 1046*a* and 1046*b* that correspond to the update stage 956 and actuation portions 1048*a* and 1048*b* that correspond to the light activation stage 958. It should be appreciated that the timing diagram 1000 is not drawn to scale and that the relative lengths and widths of each of the timing graphs are not intended to indicate particular voltages or durations of time. Moreover, the voltages indicated in FIG. 10 are merely for illustrative purposes and not intended to limit the scope of the disclosure. Further, for the sake of convenience, each timing graph corresponds to a voltage range defined by an upper limit and a lower limit. Generally, the term "high voltage state" as used herein corresponds to a voltage that is closer to the upper limit of the voltage range than the upper limit of the voltage range, while the term "low voltage state" corresponds to a voltage that is closer to the lower limit of the voltage range than the upper limit of the voltage range.

FIG. 9 shows a flow diagram of an example frame addressing and pixel actuation method 900. The method 900 may be employed, for example, to operate the control matrix 800 of FIG. 8. The frame addressing and pixel actuation method 900 proceeds in four general stages. First, data voltages for pixels in a display are loaded for each pixel one row at a time in a data loading stage (block 952). Next, in a precharge stage, the actuation nodes coupled to the light modulator are charged (block 954). Next, in an update stage, the voltages pre-loaded on the first update interconnect and the second update interconnect are modified causing the light modulator to assume an updated state (block 956). Upon the light modulator assuming an updated state, the light source is activated in a light activation stage (block 958).

Details of the various stages of the frame addressing and pixel actuation method 900 will be described with reference to a timing diagram depicted in FIG. 10. FIG. 10 shows a timing diagram 1000 of example voltages applied to various interconnects of a control matrix. The timing diagram 1000 may be employed, for example, to operate the control matrix 800 of FIG. 8 according to the frame addressing and pixel actuation method 900 depicted in FIG. 9.

In particular, the timing diagram 1000 includes separate timing graphs indicating the voltages at various interconnects during the various stages of the frame addressing and pixel actuation method 900 employed by the control matrix 800. The timing diagram includes a timing graph 1002 indicating the voltage applied at the data interconnect 808, a timing graph 1004 indicating the voltage at the scan-line interconnect 806, a timing graph 1006 indicating the voltage at the second global update interconnect 834, a timing graph 1008 indicating the voltage applied to the pre-charge interconnect 810, a timing graph 1010 indicating the voltage applied to the actuation voltage and a timing graph 1012 indicating the voltage applied to the first global update interconnect 832.

Further, the timing diagram 1000 is separated into a first region 1040*a* corresponding to a first pixel state and a second region 1040*b* corresponding to a second pixel state. Both the first and second regions 1040*a* and 1040*b* include portions corresponding to the various stages of the frame addressing and pixel actuation method 900 shown in FIG. 9. Each of the first and second regions 1040*a* and 1040*b* include corresponding data load portions 1042*a* and 1042*b* that correspond to the data loading stage 952, precharging portions 1044*a* and 1044*b* that correspond to the precharging stage 954, update portions 1046*a* and 1046*b* that correspond to the update stage 956 and activation portions 1048*a* and 1048*b* that correspond to the light activation stage 958. It should be appreciated that the timing diagram is not drawn to scale and that the relative lengths and widths of each of the timing graphs are not intended to indicate particular voltages or durations of time. Furthermore, the voltage levels shown in FIG. 10 are for illustrative purpose only. One of skill in the art should understand that other voltage levels can be used in different implementations.

Referring now to the frame addressing and pixel actuation method 900 depicted in FIG. 9 with references being made to the control matrix 800 depicted in FIG. 8 and the timing diagram 1000 depicted in FIG. 10, the data loading stage (block 952) corresponds to the data loading portions 1042*a* and 1042*b* of the timing diagram 1000. The frame addressing and pixel actuation method 900 begins with the data loading stage (block 952) for addressing each of the pixels of a particular row of the array. The data loading stage (block 952) proceeds with applying a data voltage corresponding to a next pixel state of the pixel (block 960). The next pixel state may be a first pixel state corresponding to a light transmissive state or a second pixel state corresponding to a light blocking state. In some implementations, a data voltage that is high corresponds to a first pixel state. This is depicted in the portion 1042*a* of the timing graph 1002. In some implementations, a data voltage that is low corresponds to a second pixel state. This is depicted in the portion 1042*b* of the timing graph 1002.

The data loading stage (block 952) then proceeds with applying a write-enabling voltage $V_{we}$ to the scan-line interconnect 806 corresponding to the row (block 962) such that the scan-line interconnect 806 is write-enabled. The application of a write-enabling voltage $V_{we}$ to the scan-line interconnect 806 for the write-enabled row turns ON the write-enable transistors, such as write-enable transistor 852, of all pixels in the row.

Upon applying the write-enabling voltage to the scan-line interconnect 806 (block 962), the data voltage $V_d$ applied to the data interconnect 808 is caused to be stored as a charge on the data store capacitor 854 of the selected pixel 802. That is, because the write-enable transistor 852 is switched ON when the data voltage $V_d$ is applied to the data interconnect 808, the data voltage $V_d$ passes through the write-enable transistor 852 to the data store capacitor 854 on which it is loaded or stored as a charge.

The process of loading data can be performed simultaneously in each of the pixels in the row that is write-enabled. In this way, the control matrix 800 selectively applies the data voltage to columns of a given row in the control matrix 800 at about the same time while that row has been write-enabled. In some implementations, the control matrix 800 only applies the data voltage to those columns that are to be actuated towards one of the first and second pixel states. Once all the pixels in the row are addressed, the write-enabling voltage applied to the scan-line interconnect 806 is removed (block 964). In some implementations, the scan-line interconnect 806 is grounded. This is depicted in the portion 1042*a* of the timing graph 1004. The data voltage applied to the data interconnect 808 is then also removed from the data voltage interconnect 808 (block 966). This is depicted in the portion 1042*a* of the timing graph 1002 if the data voltage applied to the data interconnect 808 is "high" and conversely, depicted in the portion 1042*b* of the timing graph 1002 if the data voltage applied to the data interconnect 808 is "low". In some implementations, a "high" voltage can correspond to applying a voltage lower than a holding voltage, for e.g., 0V. Conversely, a "low" voltage can correspond to applying a voltage that is equal to or greater than, for example, 0V. The data loading stage (block 952) is then repeated for subsequent rows of the array in the control matrix 800 as indicated by the arrow 968. At the end of the data loading stage (block 952), each of the data store capacitors in the selected group of pixels contains the data voltage which is appropriate for the setting of the next image state.

The control matrix 800 then proceeds with the precharge stage (block 954) where the second update interconnect 834 is brought to a low precharge voltage (block 970). This is depicted in portions 1044*a* and 1044*b* of the timing graph 1006. In some implementations, the low precharge voltage may correspond to an actuation voltage applied to the actuation voltage interconnect 820 when precharging the actuation nodes of the light modulator 804. In some implementations, the low precharge voltage ranges from about −12V–−40V. In some implementations, the second update interconnect 834 may be brought to any voltage that is sufficient to keep the second discharge transistor 824 switched OFF while the first and second actuation nodes 815 and 825 are precharged.

Upon bringing the second update interconnect 834 to the low precharge voltage, the precharge interconnect 810 is brought to a low precharge voltage (block 972). In some implementations, the precharge voltage ranges from about −12V–−40V. In some implementations, the precharge interconnect 810 is brought to a low precharge voltage that corresponds to the low precharge voltage applied to the second update interconnect 834. This is depicted in portions 1044*a* and 1044*b* of the timing graph 1008. Generally, a precharge voltage capable of switching ON the first charge transistor 812 and the second charge transistor 822 is sufficient.

Upon bringing the precharge interconnect 810 to the low precharge voltage, the actuation voltage applied to the actuation voltage interconnect 820 causes the first actuation node 815 and the second actuation node 825 to be brought to the actuation voltage applied to the actuation voltage interconnect 820. In this way, the first actuation node 815 and the second actuation node 825 are said to be 'precharged'. In some implementations, the actuation voltage interconnect 820 is maintained at an actuation voltage that corresponds to the low precharge voltage of the precharge interconnect 810. In some implementations, the actuation voltage interconnect 820 is maintained at about −25V-−40V.

Upon precharging the first actuation node 815 and the second actuation node 825, the precharge interconnect 810 is also brought back to a high precharge voltage (block 974). This is depicted in portions 1044*a* and 1044*b* of the timing graph 1008. In some implementations, the precharge interconnect 810 voltage is brought to ground. In some implementations, the precharge interconnect 810 remains at a low precharge voltage for approximately 10-30 μs. In some implementations, the precharge interconnect remains at a low precharge voltage for a period longer than 30 μs.

Upon precharging the first actuation node 815 and the second actuation node 825, the control matrix 800 proceeds with the update stage (block 956). In this stage, the first update interconnect 832 is brought to a high voltage (block 980). In some implementations, the first update interconnect 832 is connected to ground. The change in the voltage applied to the first update interconnect 832 is depicted in the portions 1046*a* and 1046*b* of the timing graph 1012. If the data voltage stored on the data store capacitor 854 is "high", corresponding to the first pixel state, the first discharge transistor 814 is switched ON upon bringing the first update interconnect 832 to a high voltage. As a result, the voltage at the first actuation node 815 is brought to a high voltage. Conversely, if the data voltage stored on the data store capacitor 854 is "low" corresponding to the second pixel state, the first discharge transistor 814 remains switched OFF upon bringing the first update interconnect 832 to the high voltage. As a result, the voltage at the first actuation node 815 remains in a low voltage state corresponding to the low actuation voltage applied at the actuation voltage interconnect 520 during the precharge stage.

After the first update interconnect 832 is brought to a high voltage (block 980), the second update interconnect 834 is brought to a high voltage (block 982). The change in the voltage applied to the second update interconnect 834 is depicted in the portions 1046*a* and 1046*b* of the timing graph 1006. In some implementations, the second update interconnect 834 is connected to ground. In some implementations, the second update interconnect 834 is held at a low voltage long enough for the first actuation node 815 to settle in response to raising the first update interconnect 832. In some implementations, the high voltage state may correspond to a voltage that is sufficient to switch the second discharge transistor 824 from an OFF state to an ON state, provided the first actuation node 815 is at a low voltage state. If the first actuation node 815 is brought to a high voltage corresponding to the first pixel state, the second discharge transistor 824 remains switched OFF upon bringing the second update interconnect 834 to a high voltage. As a result, the voltage at the second actuation node 825 remains at a low voltage. Conversely, if the first actuation node 815 remains at a low voltage state corresponding to the second pixel state, the second discharge transistor 824 is switched ON upon bringing the second update interconnect 834 to the high voltage state. As a result, the voltage at the second actuation node 825 is brought to a high voltage state.

Based on the relative voltage states at the first actuation node 815 and the second actuation node 825, the light modulator 804 assumes either a first pixel state or a second pixel state. In some implementations, the light modulator 804 can assume the first pixel state when the first actuation node 815 is at a low voltage state, while the second actuation node 825 is at a high voltage state. Conversely, the light modulator 804 can assume the second pixel state when the first actuation node 815 is at a high voltage state, while the second actuation node 825 is at a low voltage state. In some implementations, the light modulator 804 may include a shutter. In such implementations, during the update stage 956, the shutter can either remain in a previous pixel state or be actuated to assume a new pixel state.

Once the actuator of the light modulator 804 is stable in its desired state, the control matrix 800 proceeds with the light activation stage 958. The light activation stage proceeds with bringing the first update interconnect 832 and the second update interconnect 834 to a hold voltage (block 984). The hold voltage is typically about equal to the voltage being applied to the gate terminal of the first discharge transistor 814 and the second discharge transistor 824. In this way, the first discharge transistor 814 and the second discharge transistor 824 can be switched OFF as the control matrix 800 prepares for the data loading stage corresponding to the next pixel state. In some implementations, the second update interconnect 834 is brought to the holding voltage state after the light modulator 804 has settled in the pixel state corresponding to the data voltage.

Upon bringing the first update interconnect 832 and the second update interconnect 834 to a hold voltage, the control matrix 800 proceeds with activating one or more light sources (block 986). The light activation portions 1048*a* and 1048*b* of the timing diagram 1000 correspond to the light activation stage (block 958). During the light activation stage, all of the voltages applied to the various interconnects may be held, as depicted in the portions 1048*a* and 1048*b* of the timing diagram 1000. Upon activating the light source (block 986), the frame addressing and pixel actuation method 900 can be repeated by returning to the data loading stage (block 952).

Figure 11:
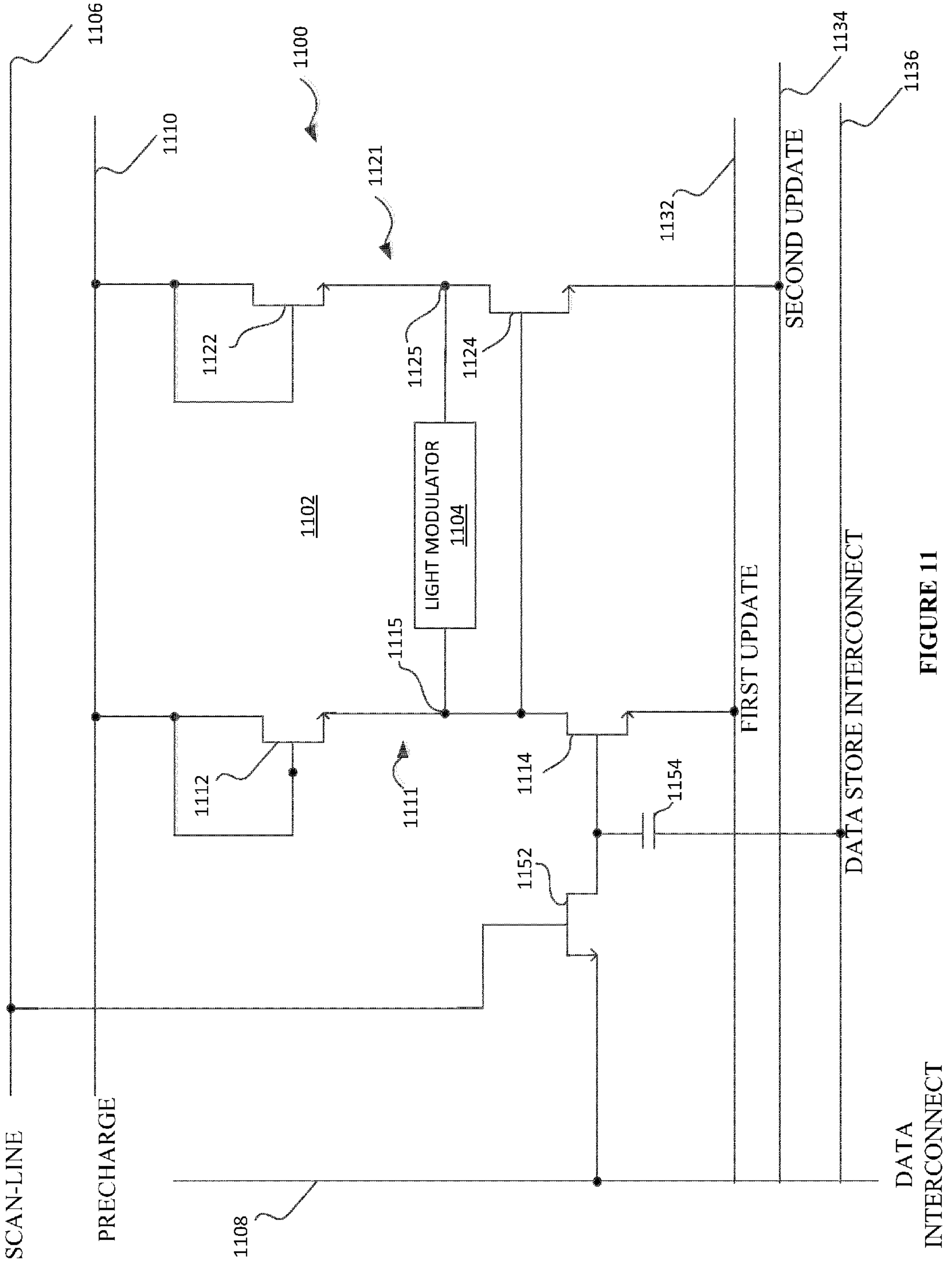
FIG. 11 shows a portion of another example control matrix.

FIG. 11 shows a portion of another example control matrix. The control matrix 1100 is similar to the control matrix 500 depicted in FIG. 5, but differs from the control matrix 500 in that the control matrix 1100 includes a single actuation interconnect 1120 and no precharge interconnect. This is possible by utilizing diode connected transistors. As shown in FIG. 11, the control matrix includes a first charge transistor 1112 and a second charge transistor 1122 that are diode connected transistors. Such transistors are configured such that the drain and gate terminals are connected at a node such that both the drain terminal and the gate terminal receive the same voltage.

The control matrix 1100 may be suitable for use in implementations where using transistors that are reliably in an OFF state when the gate to source voltage ($V_{GS}$) is 0V. Transistors that operate as depletion mode devices may be implemented in a control matrix configuration that includes a separate precharge interconnect and actuation voltage interconnect, such as the control matrix 500 depicted in FIG. 5. Such transistors, such as those fabricated using IGZO processes, tend to have difficulty controlling thresholds above 0V. As a result, a control matrix, such as control matrix 500, can be utilized in conjunction with displays made using IGZO processes or other similar displays.

Figure 12A:
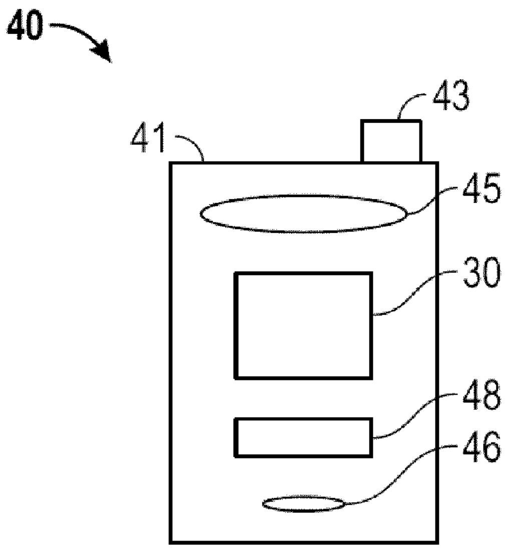
FIGS. 12A and 12B are system block diagrams illustrating a display device that includes a plurality of display elements.
Figure 12B:
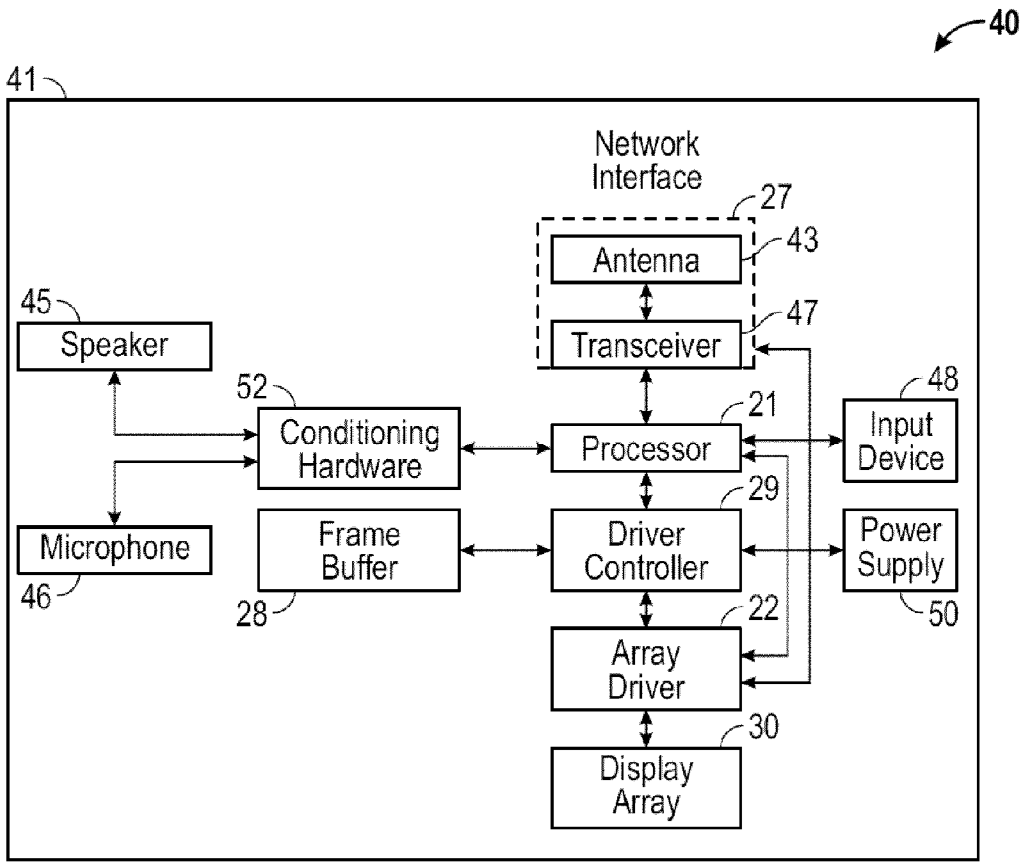

FIGS. 12A and 12B are system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL), organic light-emitting diode (OLED), super-twisted nematic liquid crystal display (STN LCD), or thin film transistor (TFT) LCD, or a non-flat-panel display, such as a cathode ray tube (CRT) or other tube device.

The components of the display device 40 are schematically illustrated in FIG. 12A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 12A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22, and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as the controller 134 described above with respect to FIG. 1). Additionally, the array driver 22 can be a conventional driver or a bi-stable display driver. Moreover, the display array 30 can be a conventional display array or a bi-stable display array (such as a display including an array of display elements, such as light modulator array 320 depicted in FIG. 3). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display apparatus, comprising:

an array of display elements, each having a first actuator configured to drive the display element into a first state and a second actuator configured to drive the display element into a second state; and a control matrix including, for each pixel, a circuit including a first state inverter and a second state inverter, the first state inverter having an output coupled to an input of the second state inverter;

a first update interconnect coupled to the first state inverter, the first update interconnect configured such that altering a voltage applied to the first update interconnect causes the first actuator to respond to a data voltage corresponding to a future pixel state of the pixel; and a second update interconnect coupled to the second state inverter, the second update interconnect configured such that altering a voltage applied to the second update interconnect causes the second actuator to respond to a voltage state of the first inverter.

2. The display apparatus of claim 1, wherein the control matrix is using transistors having a layer of indium-gallium-zinc-oxide (IGZO).

3. The display apparatus of claim 1, wherein a data store capacitor coupled to an input of the first inverter and configured to store the data voltage.

4. The display apparatus of claim 1, wherein the display apparatus is configured to maintain the actuation voltage interconnect at about an actuation voltage throughout addressing and actuation of the plurality of display elements.

5. The display apparatus of claim 1, wherein the display apparatus is configured to: lower a voltage applied to the first update interconnect to a first low voltage to cause the first inverter to respond to the data voltage, and after the first inverter responds to the data voltage, lower a voltage applied to the second update interconnect to cause the second inverter to respond to the voltage state of the first inverter.

6. The display apparatus of claim 5, wherein the first inverter includes a first discharge transistor coupled to the first update interconnect and the second inverter includes a second discharge transistor coupled to the second update interconnect, an output of the first discharge transistor is coupled to the input of the second discharge transistor, and wherein upon lowering the voltage applied to the first update interconnect to the first low voltage, the first discharge transistor is responsive to the data voltage causing the first inverter to assume a state responsive to the data voltage; and upon lowering the voltage applied to the second update interconnect, the second discharge transistor is responsive to the state of the first inverter such that the second inverter assumes a state opposite the state of the first inverter.

7. The display apparatus of claim 6, further comprising activating at least one light source responsive to the second inverter assuming a state opposite the state of the first inverter.

8. The display apparatus of claim 1, wherein the display apparatus is configured to: raise a voltage applied to the first update interconnect to a first voltage state to cause the first inverter to respond to the data voltage, and after the first inverter responds to the data voltage, raise a voltage applied to the second update interconnect to cause the second inverter to respond to the voltage state of the first inverter.

9. The display apparatus of claim 8, wherein the first inverter includes a first discharge transistor coupled to the first update interconnect and the second inverter includes a second discharge transistor coupled to the second update interconnect, an output of the first discharge transistor is coupled to the input of the second discharge transistor, and wherein upon raising the voltage applied to the first update interconnect to the first voltage state, the first discharge transistor is responsive to the data voltage causing the first inverter to assume a state responsive to the data stored on the data voltage; and upon raising the voltage applied to the second update interconnect, the second discharge transistor is responsive to the state of the first inverter such that the second inverter assumes a state opposite the state of the first inverter.

10. The display apparatus of claim 9, further comprising activating at least one light source responsive to the second inverter assuming a state opposite the state of the first inverter.

11. The display apparatus of claim 1, wherein the circuit is symmetric such that the input of the first state inverter and the input of the second state inverter are configured to receive complementary data inputs.

12. The display apparatus of claim 1, wherein the circuit includes one of only n-type transistors and only p-type transistors.

13. The display apparatus of claim 1, wherein the circuit further includes a single actuation voltage interconnect coupled to the first state inverter and the second state inverter.

14. The display apparatus of claim 13, wherein the first state inverter includes a first charge transistor coupled to the actuation voltage interconnect and the second inverter includes a second charge transistor coupled to the actuation voltage interconnect.

15. The display apparatus of claim 13, wherein the first state inverter includes a first diode connected transistor and the second state inverter includes a second diode connected transistor, and wherein the first diode connected transistor and the second diode connected transistor are connected to a single actuation voltage interconnect.

16. The display apparatus of claim 1, wherein the circuit further includes a pre-charge voltage interconnect coupled to the first state inverter and the second state inverter.

17. The display apparatus of claim 1, wherein the display elements include light modulators.

18. The display apparatus of claim 1, wherein the display elements include electromechanical system (EMS) display elements.

19. The display apparatus of claim 1, wherein the display elements include microelectromechanical system (MEMS) display elements.

20. The display apparatus of claim 1, further comprising:

a display including the array of display elements;

a processor that is configured to communicate with the display, the processor being configured to process image data; and a memory device that is configured to communicate with the processor.

21. The display apparatus of claim 20, further comprising:

a driver circuit configured to send at least one signal to the display; and wherein the processor further configured to send at least a portion of the image data to the driver circuit.

22. The display apparatus of claim 20, further comprising:

an image source module configured to send the image data to the processor, wherein the image source module comprises at least one of a receiver, transceiver, and transmitter.

23. The display apparatus of claim 20, further comprising:

an input device configured to receive input data and to communicate the input data to the processor.

* * * * *